US012252666B2

(12) United States Patent
Ellingson et al.

(10) Patent No.: US 12,252,666 B2
(45) **Date of Patent: *Mar. 18, 2025**

(54) RINSE AID FORMULATION FOR CLEANING AUTOMOTIVE PARTS

(71) Applicant: ECOLAB USA INC., Saint Paul, MN (US)

(72) Inventors: Alissa Ellingson, Saint Paul, MN (US); Janel Marie Kieffer, Saint Paul, MN (US)

(73) Assignee: ECOLAB USA INC., Saint Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/352,419

(22) Filed: Jul. 14, 2023

(65) Prior Publication Data

US 2023/0357667 A1 Nov. 9, 2023

Related U.S. Application Data

(63) Continuation of application No. 17/448,980, filed on Sep. 27, 2021, now Pat. No. 11,746,306, which is a (Continued)

(51) Int. Cl.
*C11D 1/72* (2006.01)
*B08B 3/04* (2006.01)
(Continued)

(52) U.S. Cl.
CPC ............ *C11D 1/8255* (2013.01); *C11D 3/042* (2013.01); *C11D 3/2072* (2013.01); (Continued)

(58) Field of Classification Search
CPC .. C11D 1/008; C11D 1/12; C11D 1/72; C11D 1/722; C11D 1/8255; C11D 1/83; (Continued)

(56) References Cited

U.S. PATENT DOCUMENTS

| | | | |
|---|---|---|---|
| 4,426,362 | A | 1/1984 | Copeland et al. |
| 4,492,646 | A | 1/1985 | Welch |

(Continued)

FOREIGN PATENT DOCUMENTS

| | | | |
|---|---|---|---|
| CA | 2369064 | A1 | 2/2000 |
| CA | 2431925 | C | 8/2002 |

(Continued)

OTHER PUBLICATIONS

Ecolab USA Inc., PCT/US2019/043339 filed Jul. 25, 2019, The International Search Report and the Written Opinion of the International Searching Authority, or the Declaration, 16 pages, mailed Oct. 9, 2019.

(Continued)

*Primary Examiner* — Brian P Mruk
(74) *Attorney, Agent, or Firm* — McKee, Voorhees & Sease, PLC

(57) ABSTRACT

Hard surface rinse aid compositions incorporating surfactant systems compatible with plastics and plastics containing metals, such as aluminum, are disclosed. The hard surface rinse aid compositions are particularly well suited for use in high concentrations at low temperatures without causing foaming and/or debris or film on the treated surface. In particular, the plastic and aluminum-compatible hard surface rinse aid compositions containing a surfactant system combining nonionic alcohol alkoxylates and a polymer surfactant can be used in treating hard surfaces requiring good sheeting, wetting and drying properties. The methods are particularly well suited for rinsing automotive parts, including those needing painting.

20 Claims, 10 Drawing Sheets

Related U.S. Application Data continuation of application No. 16/521,810, filed on Jul. 25, 2019, now Pat. No. 11,155,769.

(51) Int. Cl.

| | |
|---|---|
| ***C11D 1/722*** | (2006.01) |
| ***C11D 1/825*** | (2006.01) |
| ***C11D 1/83*** | (2006.01) |
| ***C11D 3/04*** | (2006.01) |
| ***C11D 3/20*** | (2006.01) |
| ***C11D 3/34*** | (2006.01) |
| ***C11D 3/37*** | (2006.01) |

(52) U.S. Cl.

CPC .............. *C11D 3/3418* (2013.01); *C11D 1/72* (2013.01); *C11D 1/722* (2013.01)

(58) Field of Classification Search

CPC ......... C11D 3/042; C11D 3/181; C11D 3/182; C11D 3/3418; C11D 3/3707; B08B 3/04

See application file for complete search history.

(56) References Cited

U.S. PATENT DOCUMENTS

| | | | |
|---|---|---|---|
| 4,618,914 | A | 10/1986 | Sato et al. |
| 4,647,258 | A | 3/1987 | Massarsch |
| 4,654,161 | A | 3/1987 | Kollmeier et al. |
| 4,687,121 | A | 8/1987 | Copeland |
| 4,690,305 | A | 9/1987 | Copeland |
| RE32,763 | E | 10/1988 | Fernholtz et al. |
| RE32,818 | E | 1/1989 | Fernholtz et al. |
| 4,826,661 | A | 5/1989 | Copeland et al. |
| 4,830,773 | A | 5/1989 | Olson |
| 4,844,744 | A | 7/1989 | Leiter et al. |
| 5,114,607 | A | 5/1992 | Deck et al. |
| 5,137,694 | A | 8/1992 | Copeland et al. |
| 5,264,147 | A | 11/1993 | Houghton et al. |
| 5,286,300 | A | 2/1994 | Hnatin et al. |
| 5,397,506 | A | 3/1995 | Groth et al. |
| 5,474,698 | A | 12/1995 | Rolando et al. |
| 5,501,815 | A | 3/1996 | Man |
| 5,589,099 | A | 12/1996 | Baum |
| 5,603,776 | A | 2/1997 | Lentsch et al. |
| 5,674,831 | A | 10/1997 | Schulz et al. |
| 5,876,514 | A | 3/1999 | Rolando et al. |
| 5,880,089 | A | 3/1999 | Lentsch et al. |
| H1818 | H | 11/1999 | Potgieter et al. |
| 6,258,765 | B1 | 7/2001 | Wei et al. |
| 6,294,515 | B1 | 9/2001 | Baum |
| 6,398,820 | B1 | 6/2002 | Merz et al. |
| 6,530,383 | B1 | 3/2003 | Rogmann et al. |
| 6,537,961 | B1 | 3/2003 | Koch |
| RE38,262 | E | 10/2003 | Rolando et al. |
| 6,838,422 | B2 | 1/2005 | Man et al. |
| 6,866,888 | B2 | 3/2005 | Baker et al. |
| 6,956,019 | B2 | 10/2005 | Lentsch et al. |
| 7,279,455 | B2 | 10/2007 | Kieffer et al. |
| 7,592,301 | B2 | 9/2009 | Smith et al. |
| 7,906,474 | B2 | 3/2011 | Varineau et al. |
| 7,960,333 | B2 | 6/2011 | Kieffer et al. |
| 8,211,851 | B2 | 7/2012 | Kieffer et al. |
| 8,324,147 | B2 | 12/2012 | Kieffer et al. |
| 8,395,118 | B2 | 3/2013 | Kryskowski et al. |
| 8,450,264 | B1 | 5/2013 | Kieffer et al. |
| 8,567,161 | B2 | 10/2013 | Man et al. |
| 8,642,530 | B2 | 2/2014 | Kieffer et al. |
| 8,935,118 | B2 | 1/2015 | Man et al. |
| 8,957,011 | B2 | 2/2015 | Kieffer et al. |
| 9,982,220 | B2 * | 5/2018 | Kieffer ................ A47L 15/0007 |
| 10,017,714 | B2 | 7/2018 | Kieffer et al. |
| 10,550,354 | B2 | 2/2020 | Kieffer et al. |
| 10,683,466 | B2 | 6/2020 | Kieffer et al. |
| 11,155,769 | B2 * | 10/2021 | Ellingson ............... C11D 3/042 |
| 11,198,836 | B2 | 12/2021 | Kieffer et al. |
| 11,274,265 | B2 | 3/2022 | Kieffer et al. |
| 11,746,306 | B2 * | 9/2023 | Ellingson ............. C11D 3/3418 510/421 |
| 2002/0147124 | A1 | 10/2002 | Klos et al. |
| 2002/0165115 | A1 | 11/2002 | Daniels et al. |
| 2002/0192340 | A1 | 12/2002 | Swart et al. |
| 2003/0109403 | A1 | 6/2003 | Man et al. |
| 2003/0171243 | A1 | 9/2003 | Kischkel et al. |
| 2004/0033269 | A1 | 2/2004 | Hei et al. |
| 2004/0110657 | A1 | 6/2004 | Strothoff |
| 2004/0157760 | A1 | 8/2004 | Man et al. |
| 2004/0200511 | A1 | 10/2004 | Klos et al. |
| 2004/0235703 | A1 | 11/2004 | Kerobo et al. |
| 2006/0246242 | A1 | 11/2006 | Siegel et al. |
| 2007/0034606 | A1 | 2/2007 | Dietsche et al. |
| 2007/0138401 | A1 | 6/2007 | Tokhtuev et al. |
| 2007/0253926 | A1 | 11/2007 | Tadrowski et al. |
| 2008/0234164 | A1 | 9/2008 | Tyborski |
| 2008/0293615 | A1 | 11/2008 | Kieffer et al. |
| 2009/0023820 | A1 | 1/2009 | Dailey et al. |
| 2009/0035339 | A1 | 2/2009 | Istvan et al. |
| 2009/0196897 | A1 | 8/2009 | Gladfelter et al. |
| 2010/0009886 | A1 | 1/2010 | Smith et al. |
| 2010/0144581 | A1 | 6/2010 | Nekmard |
| 2010/0242997 | A1 | 9/2010 | Smith et al. |
| 2010/0292127 | A1 | 11/2010 | Kieffer et al. |
| 2010/0294309 | A1 | 11/2010 | Tropsch |
| 2010/0300044 | A1 | 12/2010 | Man et al. |
| 2011/0039754 | A1 | 2/2011 | DeDominicis et al. |
| 2011/0112003 | A1 | 5/2011 | Mohs et al. |
| 2011/0112006 | A1 | 5/2011 | Cobb et al. |
| 2011/0160116 | A1 | 6/2011 | Mckechnie et al. |
| 2011/0277786 | A1 | 11/2011 | Zhu |
| 2011/0319669 | A1 | 12/2011 | Yu et al. |
| 2012/0220512 | A1 | 8/2012 | Snodgrass et al. |
| 2012/0225805 | A1 | 9/2012 | Kieffer et al. |
| 2012/0291818 | A1 | 11/2012 | Monsrud et al. |
| 2013/0172228 | A1 | 7/2013 | Bartelme et al. |
| 2013/0225471 | A1 | 8/2013 | Taneja et al. |
| 2014/0121151 | A1 | 5/2014 | Kieffer et al. |
| 2014/0261567 | A1 | 9/2014 | Miralles |
| 2015/0284663 | A1 | 10/2015 | Miralles |
| 2017/0044467 | A1 | 2/2017 | Monsrud et al. |
| 2017/0107314 | A1 | 4/2017 | Olson et al. |
| 2017/0121200 | A1 | 5/2017 | Brozell |
| 2017/0198240 | A1 | 7/2017 | Fast |
| 2018/0015509 | A1 | 1/2018 | Carter et al. |
| 2018/0023037 | A1 | 1/2018 | Silvernail et al. |
| 2018/0208876 | A1 | 7/2018 | Man et al. |
| 2019/0093050 | A1 | 3/2019 | Man et al. |
| 2021/0071108 | A1 | 3/2021 | Kieffer et al. |
| 2022/0154103 | A1 | 5/2022 | Kieffer et al. |
| 2022/0266263 | A1 | 8/2022 | Michailovski et al. |

FOREIGN PATENT DOCUMENTS

| | | | |
|---|---|---|---|
| CN | 104862716 | A | 8/2015 |
| CN | 107675227 | A | 2/2018 |
| CN | 107761116 | A | 3/2018 |
| DE | 2547389 | A1 | 5/1977 |
| DE | 69918694 | T2 | 7/2005 |
| EP | 1102834 | B1 | 7/2004 |
| EP | 2939263 | A1 | 11/2015 |
| GB | 1462134 | | 1/1977 |
| JP | S51120050 | A | 10/1976 |
| JP | 6505044 | A | 6/1994 |
| JP | H0961349 | A | 3/1997 |
| JP | 2003336092 | A | 11/2003 |
| JP | 200491686 | A | 3/2004 |
| JP | 200716246 | A | 1/2007 |
| JP | 2009111294 | A | 5/2009 |
| JP | 2010532240 | A | 10/2010 |
| JP | 2011208130 | A | 10/2011 |
| JP | 2012512925 | A | 6/2012 |
| JP | 2014526586 | A | 10/2014 |
| RU | 2632874 | C2 | 10/2017 |
| WO | 8911525 | A1 | 11/1989 |
| WO | 0008125 | A1 | 2/2000 |
| WO | 0046327 | A1 | 8/2000 |

(56) References Cited

FOREIGN PATENT DOCUMENTS

| | | | | | |
|---|---|---|---|---|---|
| WO | 0183879 | A1 | 11/2001 | | |
| WO | 2005085321 | A1 | 9/2005 | | |
| WO | 2008148420 | A1 | 11/2008 | | |
| WO | 2009026956 | A1 | 3/2009 | | |
| WO | 2014105765 | A1 | 7/2014 | | |
| WO | 2014134826 | A1 | 9/2014 | | |
| WO | 2016187293 | A1 | 11/2016 | | |
| WO | WO 2016/187293 | * | 11/2016 | .............. | C11D 1/72 |
| WO | 2017035006 | A1 | 3/2017 | | |
| WO | 2017083798 | A1 | 5/2017 | | |
| WO | 2022093556 | A1 | 5/2022 | | |

OTHER PUBLICATIONS

European Search Report, "Supplementary European Search Report", issued in connection to European Application No. 16797217.3, 6 pages mailed Oct. 23, 2018.

Basf, "Plurafac LF-221 Alcohol Alkoxylate, Technical Bulletin", published on Jan. 30, 2002.

DOW Personal Care, KATHON CG, "A Safe, Effective, Globally Approved Preservative for Rinse-Off Products" 9 pages, Jun. 2006.

International Searching Authority "Notification of Transmittal of the International Search Report and the Written Opinion of the International Searching Authority, or the Declaration" issued in connection with International application No. PCT/US2016/033067, 16 pages, issued on Aug. 23, 2016.

International Searching Authority "Notification of Transmittal of the International Search Report and the Written Opinion of the International Searching Authority, or the Declaration" issued in connection with International application No. PCT/US2016/033087, 17 pages, issued on Aug. 24, 2016.

Ecolab USA Inc., PCT/US2016/033067 filed May 18, 2016, "Written Opinion of the International Preliminary Examining Authority", mailed May 21, 2017.

Cox et al., "Optimization of Nonionic Surfactants for Hard-Surface Cleaning", JAOCS, vol. 61, No. 7, pp. 1273-1278, Jul. 1984.

Lavoue et al., "Technical, Occupational Health and Environmental Aspects of Metal Degreasing with Aqueous Cleaners", Ann. Occup. Hyg., vol. 47, No. 6, pp. 441-459, Mar. 17, 2003.

Miller et al., "Amine Oxide/Alcohol Ethoxylate Blends: Zero-Phosphate, High-Performance, Hard-Surface Cleaners", JAOCS, vol. 72, No. 7, pp. 857-859, 1995.

Vargel, Christian, "Cleaning of Aluminium", Corrosion of Aluminium, Chapter G.6, p. 589, 2004.

Ecolab, "Plastech Ultra Dry with Benzoic" Safety Data Sheet, 9 pages.

Ecolab, "Plastech Ultra Dry with Dequest", Safety Data Sheet, 9 pages.

* cited by examiner

Comm. Formula I

Hard Surface Rinse Aid Composition

Comm. Product II

Comm. Product III

RINSE AID FORMULATION FOR CLEANING AUTOMOTIVE PARTS

CROSS-REFERENCE TO RELATED APPLICATIONS

This application is a Continuation Application of U.S. Ser. No. 17/448,980, filed Sep. 27, 2021, now U.S. Pat. No. 11,746,306, issued on Sep. 5, 2023, which is a Continuation Application of U.S. Ser. No. 16/521,810, filed Jul. 25, 2019, now U.S. Pat. No. 11,155,769, issued on Oct. 26, 2021, which application claims priority under 35 U.S.C. § 119 to U.S. Provisional Application Ser. No. 62/703,007 filed Jul. 25, 2018. Provisional Application Ser. No. 62/703,007 is incorporated herein by reference in its entirety.

FIELD OF THE INVENTION

The invention relates to surfactant systems and hard surface rinse aid compositions incorporating the same, which are particularly suitable for use as rinse aids on plastics and plastics including metals, such as aluminum. The hard surface rinse aid compositions are particularly well suited for use in high concentrations at low temperatures without causing foaming and/or debris or film on the treated surface. In particular, the plastic and aluminum-compatible hard surface rinse aid compositions containing a surfactant system combining nonionic alcohol alkoxylates and a polymer surfactant can be used in treating hard surfaces requiring good sheeting, wetting and drying properties. The methods are particularly well suited for rinsing automotive parts, including those needing painting.

BACKGROUND OF THE INVENTION

Rinsing, wetting and sheeting agents are used in a variety of applications to lower the surface tension of water to allow a solution to wet surfaces more effectively. Wetting agents are included in numerous compositions including, but not limited to, cleaning solutions, antimicrobial solutions, paints, adhesives, and inks. A number of wetting agents are currently known, each having certain advantages and disadvantages. A number of rinse aids are currently known, each having certain advantages and disadvantages.

There is an ongoing need for improved wetting agent and/or rinsing agent compositions. This is a need for effective cleaning and rinsing of hard surfaces prior to applications of coatings, such as paint. For example, in the automotive industry it is customary to clean and rinse hard surfaces such as plastic and metal automotive parts prior to painting. Conventional rinsing agents are insufficient in promoting drying and preventing the formation of spots on the hard surfaces. This can negatively impact the application of coatings such as paint adhered to the surfaces.

Accordingly, it is an objective of the claimed invention to develop efficient surfactant systems for hard surface rinse aid applications, including cleaning and rinsing plastic auto parts prior to painting, including plastic auto parts also having soft metal content.

A further object is to provide hard surface rinse aid compositions providing improved sheeting, wetting and fast drying without spots.

A further object is to provide hard surface rinse aid compositions that are less acidic than conventional compositions while maintaining and/or improving cleaning performance, while also reducing the amount of phosphates in the compositions.

Other objects, advantages and features of the present invention will become apparent from the following specification taken in conjunction with the accompanying drawings.

BRIEF SUMMARY OF THE INVENTION

In an embodiment, the present invention relates to hard surface rinse aid compositions employing the surfactant systems and acidic preservative composition, and methods of using the same.

In an embodiment, a hard surface rinse aid composition comprises: (A) a nonionic alcohol alkoxylate surfactant according to the formula (I): $R^1$-O-$(EO)_{x1}(PO)_{y1}$-H (I) wherein $R^1$ is a straight-chain $C_{10}$-$C_{16}$ alkyl, wherein $x_1$ is from 4 to 8, and wherein $y_1$ is from 2 to 5; (B) a nonionic alcohol alkoxylate surfactant according to the formula (II): $R^2$-O-$(EO)_{x2}$-H (II) wherein $R^2$ is $C_{10}$-$C_{14}$ alkyl with an average of at least 2 branches per residue, and wherein $x_2$ is from 5 to 10; (C) a reverse block co-polymer surfactant according to the formula (III):

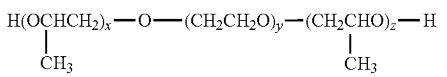

(III)

wherein x is from 15-25, y is from 10 to 25, and z is from 15 to 25; (D) an acidic preservative composition comprising an anionic hydrotrope and an aluminum compatible preservative; and (D) water, wherein the ratio (on a weight percent basis) of the anionic hydrotrope to water is from about 0.1:1 to about 0.5:1, wherein a use solution of the composition comprises at least 1 wt-% of the composition and has a pH between about 4 to about 7 and is free of a detergent alkalinity source.

In another embodiment, a hard surface rinse aid composition comprises: (A) from about 0.5 wt-% to about 5 wt-% of a nonionic alcohol alkoxylate surfactant according to the formula (I): $R^1$-O-$(EO)_{x1}(PO)_{y1}$-H (I) wherein $R^1$ is a straight-chain $C_{10}$-$C_{16}$ alkyl, wherein $x_1$ is from 4 to 8, and wherein $y_1$ is from 2 to 5; (B) from about 0.5 wt-% to about 5 wt-% of a nonionic alcohol alkoxylate surfactant according to the formula (II): $R^2$-O-$(EO)_{x2}$-H (II) wherein $R^2$ is $C_{10}$-$C_{14}$ alkyl with an average of at least 2 branches per residue, and wherein $x_2$ is from 5 to 10; (C) from about 5 wt-% to about 25 wt-% of a polymer surfactant according to the formula (III):

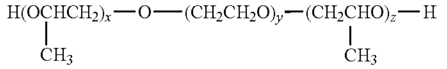

(III)

wherein x is from 15-25, y is from 10 to 25, and z is from 15 to 25; (D) an acidic preservative composition comprising from about 10 wt-% to about 40 wt-% of an anionic hydrotrope and from about 0.01 wt-% to about 5 wt-% of an acid preservative and an optional additional aluminum compatible preservative; and (E) water, wherein the ratio (on a weight percent basis) of the anionic hydrotrope to water is from about 0.1:1 to about 0.5:1, wherein a use solution of the composition comprises between about 1-3 wt-% of the composition and has a pH between about 4 to about 7 and is free of a detergent alkalinity source.

In an embodiment, a method of rinsing a hard surface outside of a ware wash and kitchen environment comprises: contacting a hard surface rinse aid composition according to claim 1 to a surface in need of cleaning and rinsing; wherein the surface comprises plastic and optionally metal.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

Figure 1:
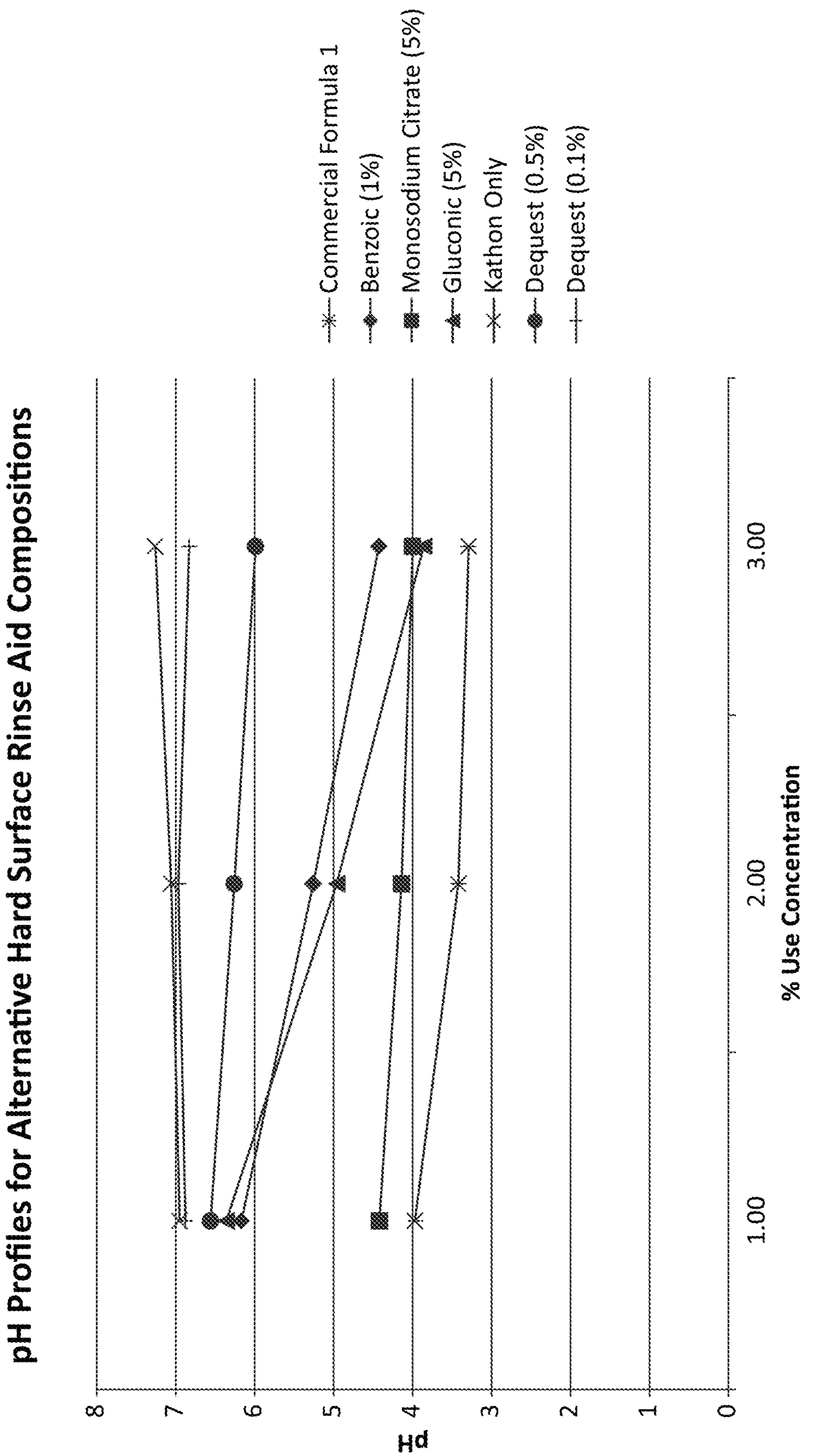
FIG. 1 shows a plot of pH profiles for the hard surface rinse aid compositions evaluated herein using alternative weak acids as part of the acidic preservative composition to maintain a desired pH range at 1-3% use solution between about 4-7 in comparison to Commercial Formula 1.

Various embodiments of the present invention will be described in detail with reference to the drawings, wherein like reference numerals represent like parts throughout the several views. Reference to various embodiments does not limit the scope of the invention. Figures represented herein are not limitations to the various embodiments according to the invention and are presented for exemplary illustration of the invention.

DETAILED DESCRIPTION OF THE PREFERRED EMBODIMENT

The present invention relates to hard surface rinse aid compositions employing the surfactant systems and acidic preservative composition for various applications, including rinse aid applications for cleaning and rinsing automotive parts. The hard surface rinse aid compositions have many advantages over conventional combinations of surfactants due to improved sheeting, wetting and fast drying, particularly for plastics and other wares.

The embodiments of this invention are not limited to particular applications of use for the hard surface rinse aid compositions, which can vary and are understood by skilled artisans. It is further to be understood that all terminology used herein is for the purpose of describing particular embodiments only, and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form.

Numeric ranges recited within the specification are inclusive of the numbers within the defined range. Throughout this disclosure, various aspects of this invention are presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range (e.g. 1 to 5 includes 1, 1.5, 2, 2.75, 3, 3.80, 4, and 5).

So that the present invention may be more readily understood, certain terms are first defined. Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments of the present invention without undue experimentation, the preferred materials and methods are described herein. In describing and claiming the embodiments of the present invention, the following terminology will be used in accordance with the definitions set out below.

The term "about," as used herein, refers to variation in the numerical quantity that can occur, for example, through typical measuring and liquid handling procedures used for making concentrates or use solutions in the real world; through inadvertent error in these procedures; through differences in the manufacture, source, or purity of the ingredients used to make the compositions or carry out the methods; and the like. The term "about" also encompasses amounts that differ due to different equilibrium conditions for a composition resulting from a particular initial mixture. Whether or not modified by the term "about", the claims include equivalents to the quantities.

The term "actives" or "percent actives" or "percent by weight actives" or "actives concentration" are used interchangeably herein and refers to the concentration of those ingredients involved in cleaning expressed as a percentage minus inert ingredients such as water or salts.

An "antiredeposition agent" refers to a compound that helps keep suspended in water instead of redepositing onto the object being cleaned. Antiredeposition agents are useful in the present invention to assist in reducing redepositing of the removed soil onto the surface being cleaned.

As used herein, the term "cleaning" refers to a method used to facilitate or aid in soil removal, bleaching, microbial population reduction, and any combination thereof. As used herein, the term "microorganism" refers to any noncellular or unicellular (including colonial) organism. Microorganisms include all prokaryotes. Microorganisms include bacteria (including cyanobacteria), spores, lichens, fungi, protozoa, virinos, viroids, viruses, phages, and some algae. As used herein, the term "microbe" is synonymous with microorganism.

The term "hard surface" refers to a solid, substantially non-flexible surface such as an automotive parts, including those of cars, trucks, ATVs, tractors, boats, and the like. The hard surface parts can include for example doors, fenders, handles, paneling, including exterior paneling, roofs, trim, and the like. Hard surfaces may include for example, health care surfaces and food processing surfaces, production equipment, parts, belts, conveyors, instruments, a counter top, tile, floor, wall, panel, window, plumbing fixture, kitchen and bathroom furniture, appliance, engine, circuit board, and dish.

As used herein, the term "polymer" generally includes, but is not limited to, homopolymers, copolymers, such as for example, block, graft, random and alternating copolymers, terpolymers, and higher "x"mers, further including their derivatives, combinations, and blends thereof. Furthermore, unless otherwise specifically limited, the term "polymer" shall include all possible isomeric configurations of the molecule, including, but are not limited to isotactic, syndiotactic and random symmetries, and combinations thereof. Furthermore, unless otherwise specifically limited, the term "polymer" shall include all possible geometrical configurations of the molecule.

As used herein, the term "soil" or "stain" refers to a non-polar oily substance which may or may not contain particulate matter such as mineral clays, sand, natural mineral matter, carbon black, graphite, kaolin, environmental dust, etc.

As used herein, the term "substantially free" refers to compositions completely lacking the component or having such a small amount of the component that the component does not affect the performance of the composition. The component may be present as an impurity or as a contaminant and shall be less than 0.5 wt-%. In another embodiment, the amount of the component is less than 0.1 wt-% and in yet another embodiment, the amount of component is less than 0.01 wt-%.

The term "weight percent," "wt-%," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt-%," etc.

The methods and compositions of the present invention may comprise, consist essentially of, or consist of the components and ingredients of the present invention as well as other ingredients described herein. As used herein, "consisting essentially of" means that the methods and compositions may include additional steps, components or ingredients, but only if the additional steps, components or ingredients do not materially alter the basic and novel characteristics of the claimed methods and compositions.

Compositions

The hard surface rinse aid compositions include a surfactant system for use in cleaning hard surfaces comprising plastics and optionally metals, such as aluminum, in combination with the plastic. In some aspects, the hard surface rinse aid composition includes a surfactant system, an acidic preservative composition and water. Beneficially, the hard surface rinse aid compositions are effective at cleaning, while also reducing spotting and filming on the treated surface leaving a spot-free smooth surface, including those suitable for painting or coating the clean surface.

In an aspect the compositions comprise, consist of or consist essentially of a surfactant system disclosed herein. In further aspects, the compositions further include a surfactant system comprising at least one nonionic alcohol alkoxylate surfactant and a polymer surfactant. In further aspects, the compositions comprise, consist of or consist essentially of a surfactant system comprising at least one nonionic alcohol alkoxylate surfactant and a polymer surfactant and an acidic preservation composition. In further aspects, the compositions comprise, consist of or consist essentially of a surfactant system comprising at least one nonionic alcohol alkoxylate surfactant and a polymer surfactant and an acidic preservation composition comprising an anionic hydrotrope and an aluminum compatible preservative(s). The compositions can additionally include water and additional functional ingredients.

Exemplary ranges of the compositions are shown in Tables 1A-1B in weight percentage.

TABLE 1A

| | Exemplary wt-% ranges | | | |
|---|---|---|---|---|
| Component | 1 | 2 | 3 | 4 |
| Nonionic Alcohol Alkoxylate Surfactant(s) (Surfactants I/II) | 0.5-20 | 1-15 | 1-10 | 1-5 |
| Reverse Block Co-Polymer Surfactant (Surfactant III) | 5-30 | 5-25 | 5-20 | 10-20 |
| Acidic Preservation Composition | 5-50 | 10-45 | 12-45 | 12-40 |
| Water | 40-80 | 50-80 | 50-70 | 50-65 |
| Optional Additional Functional Ingredients | 0-25 | 0-20 | 0-15 | 0-10 |

TABLE 1B

| | Exemplary wt-% ranges | | | |
|---|---|---|---|---|
| Component | 1 | 2 | 3 | 4 |
| Nonionic Alcohol Alkoxylate Surfactant(s) (Surfactants I/II) | 0.5-20 | 1-15 | 1-10 | 1-5 |
| Reverse Block Co-Polymer Surfactant (Surfactant III) | 5-30 | 5-25 | 5-20 | 10-20 |
| Anionic Hydrotrope | 5-40 | 10-40 | 10-35 | 20-30 |
| Aluminum Compatible Preservative(s) | 0.01-10 | 0.1-10 | 0.1-8 | 0.5-5 |
| Water | 40-80 | 50-80 | 50-70 | 50-65 |
| Optional Additional Functional Ingredients | 0-25 | 0-20 | 0-15 | 0-10 |

Surfactant Systems

In an aspect, the surfactant system includes at least one nonionic alcohol alkoxylate surfactant and a polymer surfactant. In an aspect, the surfactant system includes two nonionic alcohol alkoxylate surfactant and a polymer surfactant. Beneficially, the combination of surfactants provides synergy such that reduced actives of the surfactants are required to provide the desired properties of sheeting, wetting and drying. As a further benefit, the surfactant systems include combinations of surfactants having varying degrees of association, providing the beneficial result of reduced or low foam or filming profiles, as the generation of high and/or stable foam is not desirable according to the invention.

Exemplary ranges of the surfactants are shown in Table 2 in weight percentage of the hard surface composition.

TABLE 2

| Surfactant | | Exemplary wt-ranges of composition | | | |
|---|---|---|---|---|---|
| | | 1 | 2 | 3 | 4 |
| Surfactant I | $R^1$—O—$(EO)_{x1}(PO)_{y1}$—H | 0.5-10 | 0.5-7.5 | 0.5-5 | 0.5-3 |
| Surfactant II | $R^2$—O—$(EO)_{x2}$—H | 0.5-10 | 0.5-7.5 | 0.5-5 | 0.5-3 |

TABLE 2-continued

| Surfactant | | Exemplary wt-ranges of composition 1 | 2 | 3 | 4 |
|---|---|---|---|---|---|
| Surfactant III | 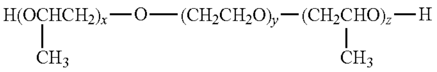 | 5-30 | 5-25 | 5-20 | 10-20 |

In an aspect, the surfactant system includes Surfactant I, a nonionic alcohol alkoxylate having the following formula: $R^1$-O-$(EO)_{x1}(PO)_{y1}$-H (I), wherein $R^1$ is a straight-chain $C_{10}$-$C_{16}$-alkyl, and wherein $x_3$=4-8, 4-5.5, 5-8, or 5.5-7, and wherein $y_3$=2-5, 3.5-5 or 2-3.5. In an aspect, the composition includes from about 0.5 wt-% to about 10 wt-%, about 0.5 wt-% to about 8 wt-%, about 0.5 wt-% to about 7.5 wt-%, about 0.5 wt-% to about 5 wt-%, about 0.5 wt-% to about 3 wt-%, or about 0.5 wt-% to about 2 wt-% of at least one alkoxylate of the formula (Surfactant I) $R^1$-O-$(EO)_{x1}$$(PO)_{y1}$-H, wherein $R^1$ is a straight-chain $C_{10}$-$C_{16}$-alkyl, and wherein $x_3$=4-8, 4-5.5, 5-8, or 5.5-7, and wherein $y_3$=2-5, 2-3.5 or 3.5-5.

In an aspect, the surfactant system includes Surfactant II, a nonionic alcohol alkoxylate having the following formula: $R^2$-O-$(EO)_{x2}$-H (II), wherein $R^2$ is a $C_{10}$-$C_{14}$ alkyl, or preferably a $C_{12}$-$C_{14}$ alkyl, with an average at least 1 branch per residue, or preferably at least 2 branches per residue, and wherein $x_2$=5-10. In an aspect, the composition includes from about 0.5 wt-% to about 10 wt-%, about 0.5 wt-% to about 8 wt-%, about 0.5 wt-% to about 7.5 wt-%, about 0.5 wt-% to about 5 wt-%, about 0.5 wt-% to about 3 wt-%, or about 0.5 wt-% to about 2 wt-% of at least one alkoxylate of the formula (Surfactant II) $R_2$-O-$(EO)_{x2}$-H, where $R_2$ is a $C_{12}$-$C_{14}$ alkyl with an average at least 2 branches per residue, and wherein $x_2$=5-10, preferably from 5-8.

In an aspect, the surfactant system includes Surfactant III, a reverse block co-polymer surfactant having the following formula:

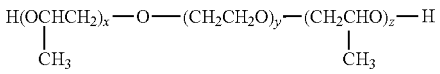

(III)

wherein x is from 15-25, y is from 10 to 25, and z is from 15 to 25. In a preferred aspect, Surfactant III is a reverse block co-polymer surfactant having foam-reducing properties. In an aspect, the composition includes from about 5 wt-% to about 30 wt-%, about 5 wt-% to about 25 wt-%, about 5 wt-% to about 20 wt-%, about 10 wt-% to about 20 wt-%, or about 10 wt-% to about 15 wt-% of the polymer surfactant of formula (Surfactant III) wherein x is from 15-25, y is from 10 to 25, and z is from 15 to 25.

In an embodiment, the surfactant system has a ratio of Surfactant I to Surfactant II of about 1:1. In an embodiment, the surfactant system has a ratio of Surfactant I to Surfactant III of from about 1:5 to about 1:20, preferably about 1:10 to about 1:20. In an embodiment, the surfactant system has a ratio of Surfactant II to Surfactant III is about 1:5 to about 1:20, preferably about 1:10 to about 1:20.

In a further embodiment, the surfactant system has a ratio of Surfactant I to Surfactant II of about 1:1, a ratio of Surfactant I to Surfactant III of from about 1:5 to about 1:20, and a ratio of Surfactant II to Surfactant III is about 1:5 to about 1:20. In a still further embodiment, the surfactant system has a ratio of Surfactant I to Surfactant II of about 1:1, a ratio of Surfactant I to Surfactant III of from about 1:10 to about 1:20, and a ratio of Surfactant II to Surfactant III is about 1:10 to about 1:20.

In an aspect, in each of the aforementioned surfactant systems, the desired properties of sheeting, wetting and drying are achieved through formulations having desirable contact angle and foam profiles.

In an aspect, the surfactant systems provide desirable foam profiles as measured according to the Glewwe method wherein after 5 minutes a foam height of 5 inches or less is achieved, preferably less than 5 inches, more preferably 1 to 5 inches, more preferably 1 to 3 inches, and most preferably less than 1 inch of foam. In a preferred aspect, the surfactant systems provide desirable foam profiles as measured according to the Glewwe method wherein after 1 minute a foam height of 0.25 inches or less is achieved. In a still further preferred aspect, the surfactant systems provide desirable foam profiles as measured according to the Glewwe method wherein after 1 minute a foam height of 0 inches is achieved. It is an unexpected benefit according to the hard surface rinse aid compositions that low foaming profiles are achieved at the high use concentrations of the surfactants and low use temperatures.

Beneficially, the hard surface rinse aid compositions provide enhanced dynamic contact angle providing efficient sheeting without leaving debris on the treated surface even with the high use concentrations employed according to the methods disclosed herein, which a skilled artisan would expect to leave debris or filming on the treated surface. In an aspect, the surfactant systems reduce the contact angles of the composition on a substrate surface by between about 5° to about 10°, or preferably between about 5° to about 20°, or more preferably between about 10° to about 25° as compared to the contact angle of a commercially available rinse aid composition, namely a commercially available rinse aid composition not employing the surfactant system combining the alcohol alkoxylate surfactants (Surfactants I and II) with the reverse block co-polymer surfactant (Surfactant III).

In a preferred aspect, the surfactant systems reduce the contact angles of the composition on a plastic by between about 5° to about 10°, or preferably between about 5° to about 20°, or more preferably between about 10° to about 25° as compared to the contact angle of a commercially available rinse aid composition. Without wishing to be bound by any particular theory, it is thought that the lower the contact angle, the more a composition will induce sheeting. That is, compositions with lower contact angles will form droplets on a substrate with a larger surface area than compositions with higher contact angles. The increased surface area results in a faster drying time, with fewer spots formed on the substrate.

Acidic Preservative Composition

In an aspect, the acidic preservation composition includes at least an anionic hydrotrope. In additional aspects, the acidic preservation composition includes at least an acidic preservative, such as for example, a phosphonate preservative or a non-phosphonate preservative. In additional aspects, the acidic preservation composition includes at least an anionic hydrotrope and an acidic preservative, and optionally an additional aluminum compatible preservative(s). In an aspect, the composition includes from about 5 wt-% to about 50 wt-%, about 10 wt-% to about 50 wt-%, about 10 wt-% to about 45 wt-%, about 12 wt-% to about 45 wt-%, about 12 wt-% to about 40 wt-%, or about 15 wt-% to about 40 wt-% of the acidic preservation compositions.

Anionic Hydrotropes

The acidic preservation composition includes at least one anionic hydrotrope, preferably a low foaming anionic hydrotrope that does not increase foaming of the surfactant systems due to the high concentrations of use thereof. Anionic hydrotropes are able to bind the nonionic surfactants and/or polymer surfactants in the hard surface rinse aid composition. The hydrotrope may be used to aid in maintaining the solubility of sheeting or wetting agents. Hydrotropes can also be used to modify the aqueous solution creating increased solubility for the organic material. In some embodiments, hydrotropes are low molecular weight aromatic sulfonate materials such as xylene sulfonates, dialkyldiphenyl oxide sulfonate materials, and cumene sulfonates.

Further exemplary anionic hydrotropes include short chain alkyl benzenes, alkyl naphthalenes and alkyl naphthalene sulfonates. In an aspect of the invention, the class of short chain alkyl benzene or alkyl naphthalene hydrotropes includes alkyl benzene sulfonates based on toluene, xylene, and cumene, and alkyl naphthalene sulfonates. These can include sodium xylene sulfonate, sodium toluene sulfonate, sodium cumene sulfonate, potassium toluene sulfonate, ammonium xylene sulfonate, calcium xylene sulfonate, sodium alkyl naphthalene sulfonate, and sodium butylnaphthalene sulfonate. Sodium xylene sulfonate is a preferred anionic hydrotrope.

In an aspect, the composition includes from about 5 wt-% to about 60 wt-%, from about 5 wt-% to about 50 wt-%, from about 5 wt-% to about 45 wt-%, about 5 wt-% to about 40 wt-%, about 10 wt-% to about 40 wt-%, about 10 wt-% to about 35 wt-%, about 15 wt-% to about 35 wt-%, or about 20 wt-% to about 30 wt-% of the anionic hydrotrope.

Aluminum Compatible Preservatives

The acidic preservation composition can include at least one aluminum compatible preservative. Exemplary aluminum compatible preservatives include phosphonates, aluminum compatible weak acids, and biocidal preservatives. As referred to herein, aluminum compatible refers to the need for preservatives that do not dissolve aluminum in solution. As a skilled artisan appreciates, aluminum is an amphoteric substance that can be attacked by both strong acids and strong bases, therefore a weaker acid is required to reduce the dissolution rate of aluminum in solution. While acids containing phosphonates are preferred for their compatibility with aluminum, additional weak acids are also suitable for use.

Exemplary phosphonates include phosphoric acid and salts, pyrophosphoric acid and salts, and preferably 1-hydroxyethylidene-1,1-diphosphonic acid and salts. In a preferred aspect, the phosphoric acid is preferred over the salt form. Without being limited to particular mechanism of action, the acidic nature of the phosphoric acids, such as diphosphonic acid, provides an acidic pH for the composition. Exemplary phosphonates include 1-hydroxyethane-1, 1-diphosphonic acid $CH_3C(OH)[PO(OH)_2]_2$; 2-phosphinobutane-1,2,4-tricarboxylic acid; aminotri (methylenephosphonic acid) $N[CH_2\ PO(OH)_2]_3$; aminotri (methylenephosphonate), sodium salt; 1-hydroxyethylidene-1,1,-diphosphonic acid; 2-hydroxyethyliminobis(methylenephosphonic acid) $HOCH_2\ CH_2\ N[CH_2\ PO(OH)_2]_2$; diethylenetriaminepenta(methylenephosphonic acid) $(HO)_2\ POCH_2\ N[CH_2\ N[CH_2\ PO(OH)_2]_2]_2$; diethylenetriaminepenta(methylenephosphonate), sodium salt $C_9\ H_{(28-x)}\ N_3\ Na_xO_{15}P_5$ (x=7); hexamethylenediamine(tetramethylenephosphonate), potassium salt $C_{10}\ H_{(28-x)}N_2K_xO_{12}P_4$ (x=6); phosphonobutane tricarboxylic acid; 2 phosphonobutane 1,2,4-tricarboxylic acid sodium salt; bis(hexamethylene)triamine(pentamethylenephosphonic acid) $(HO_2)\ POCH_2N[(CH_2)_6\ N[CH_2\ PO(OH)_2]_2]_2$; and phosphorus acid $H_3PO_3$. Further exemplary phosphonates are often referred to as HEDP, PBTC, HEDP, ATMP and DTPMP.

Additional exemplary aluminum compatible preservatives also include biocidal agents, including glutaraldehyde, sodium bicarbonate, dibromonitrilopropionamide, isothiazolone, methyl isothiazolinone (commercially available as Kathon), terbutylazine, polymeric biguanide, methylene bisthiocyanate, tetrakis hydroxymethyl phosphonium sulphate, and the like.

Additional preservatives may include one or more of the following: sorbic acid, benzoic acid, 2,2-dibromo-3-nitrilopropionamide, 2-bromo-2-nitropropane-1,3 diol, 1-bromo-1-(bromomethyl)-1,3-propanedicarbonitrile, tetrachloroisophthalonitrile, alkyldimethylbenzylammonium chloride, dimethyl dialkyl ammonium chloride, didecyl dimethyl ammonium chloride, poly(oxyethylene(dimethyliminio)ethylene(dimethyliminio)ethylene dichloride, methylene bisthiocyanate, 2-decylthioethanamine, tetrakishydroxymethyl phosphonium sulfate, dithiocarbamate, cyanodithioimidocarbonate, 2-methyl-5-nitroimidazole-1-ethanol, 2-(2-bromo-2-nitroethenyl)furan, beta-bromo-beta-nitrostyrene, beta-nitrostyrene, beta-nitrovinyl furan, 2-bromo-2-bromomethyl glutaronitrile, bis(trichloromethyl) sulfone, S-(2-hydroxypropyl)thiomethanesulfonate, tetrahydro-3,5-dimethyl-2H-1,3,5-hydrazine-2-thione, 2-(thiocyanomethylthio)benzothiazole, 2-bromo-4'-hydroxyacetophenone, 1,4-bis(bromoacetoxy)-2-butene, bis (tributyltin)oxide, 2-(tert-butylamino)-4-chloro-6-(ethylamino)-s-triazine, dodecylguanidine acetate, dodecylguanidine hydrochloride, coco alkyldimethylamine oxide, n-coco alkyltrimethylenediamine, tetra-alkyl phosphonium chloride, 7-oxabicyclo[2.2.1]heptane-2,3-dicarboxylic acid, 4,5-dichloro-2-n-octyl-4-isothiazoline-3-one, 5-chloro-2-methyl-4-isothiazolin-3-one and 2-methyl-4-isothiazolin-3-one.

In an aspect, the composition includes from about 0.01 wt-% and about 10 wt-%, about 0.1 wt-% and about 10 wt-%, about 0.1 wt-% and about 8 wt-%, about 0.5 wt-% and about 5 wt-%, or about 0.5 wt-% and about 3 wt-% of the aluminum compatible preservative(s).

In a preferred embodiment the hard surface rinse aid compositions include less than or equal to 0.5 wt-% phosphates, preferably less than 0.5 wt-% phosphates, or preferably are phosphate-free.

Carriers

The compositions are formulated as liquids. Carriers can be included in such liquid formulations. Any carrier suitable for use in a wetting agent composition can be used in the present invention. For example, in some embodiments the compositions include water as a carrier. Various water sources can be employed in the compositions, including either deionized water or non-deionized water. Without being limited to a particular mechanism of action, the liquid formulations can include deionized water as a carrier, however, water for dilution is not deionized water which surprisingly alters the pH range of the use solutions of the compositions, including for example outside a desired range of about 4 to about 7. In a preferred embodiment the water source for the composition can be deionized water and the water source for dilution is not deionized and instead contains water hardness ions.

The hard surface rinse aid compositions include a ratio of the anionic hydrotrope of the acidic preservative composition to the carrier, preferably water, on a weight percentage basis of from about 0.1:1 to about 1:1, from about 0.2:1 to about 1:1, from about 0.3:1 to about 1:1, from about 0.4:1 to about 1:1, from about 0.5:1 to about 1:1, from about 0.3:1 to about 0.9:1, from about 0.3:1 to about 0.8:1, from about 0.3:1 to about 0.7:1, from about 0.3:1 to about 0.6:1, or from about 0.3:1 to about 0.5:1.

In some embodiments, liquid compositions according to the present invention will contain no more than about 80 wt-% water, no more than 70 wt-% water, and typically no more than about 65 wt-%. In other embodiments, liquid compositions will contain at least about 50 wt-% water, or at least about 60 wt-% water as a carrier.

Additional Functional Ingredients

The hard surface rinse aid compositions can further be combined with various additional functional components suitable for use in cleaning and rinsing applications, including any applications requiring sheeting, wetting, and fast drying of surfaces. In some embodiments, the compositions including the surfactant system and acidic preservative composition make up a large amount, or even substantially all of the total weight of the composition. For example, in some embodiments few or no additional functional ingredients are disposed therein. In other embodiments, additional functional ingredients may be included in the compositions to provide desired properties and functionalities to the compositions. For the purpose of this application, the term "functional ingredient" includes a material that when dispersed or dissolved in a use and/or concentrate solution, such as an aqueous solution, provides a beneficial property in a particular use. Some particular examples of functional materials are discussed in more detail below, although the particular materials discussed are given by way of example only, and that a broad variety of other functional ingredients may be used. For example, many of the functional materials discussed below relate to materials used in rinsing and cleaning applications. However, other embodiments may include functional ingredients for use in other applications.

In exemplary embodiments, the hard surface rinse aid compositions may include carriers, water conditioning agents including additional rinse aid polymers, antiredeposition agents, antimicrobial agents, bleaching agents and/or activators, solubility modifiers, dispersants, additional rinse aids, metal protecting agents, stabilizing agents, corrosion inhibitors, sequestrants and/or chelating agents, builders, fragrances and/or dyes, humectants, rheology modifiers or thickeners, hydrotropes or couplers, buffers, solvents, pH buffers, cleaning enzymes, carriers, processing aids, solvents for liquid formulations, and the like.

Defoaming Surfactants

In some embodiments the compositions include less than about 30 wt-%, or less than about 20 wt-% defoaming surfactant or defoaming agent, or less than about 10 wt-% defoaming surfactant or defoaming agent, or preferably less than about 5 wt-% defoaming surfactant or defoaming agent to provide an effective amount of defoamer component configured for reducing the stability of foam that may be created by the surfactant system. Exemplary defoaming agents include for example nonionic EO containing surfactants that are hydrophilic and water soluble at relatively low temperatures, for example, temperatures below the temperatures at which the rinse aid will be used. Without being limited to a particular mechanism of action the inclusion of a detergent defoaming agent may negatively interact with the surfactant system as increasing amounts of defoamer demonstrate an antagonist effect of diminished efficacy due to interference with wetting and sheeting in the surfactant systems according to the invention.

Additional Surfactants

Additional surfactants can be included in the hard surface rinse aid compositions. Additional nonionic surfactants are preferred in the compositions. Exemplary additional nonionic surfactants, including additional polymer surfactants, are disclosed in U.S. Pat. Nos. 9,982,220 and 10,017,714 and U.S. Patent Publication No. 2016/0340612, which are hereby incorporated by reference in their entirety.

In an aspect, the surfactant system comprises, consists of and/or consists essentially: any combinations of at least two nonionic alcohol alkoxylate surfactants of the formulas Surfactant I and Surfactant II, the reverse block co-polymer surfactant of Surfactant III, and one or more additional nonionic surfactants.

Useful nonionic surfactants are generally characterized by the presence of an organic hydrophobic group and an organic hydrophilic group and are typically produced by the condensation of an organic aliphatic, alkyl aromatic or polyoxyalkylene hydrophobic compound with a hydrophilic alkaline oxide moiety which in common practice is ethylene oxide or a polyhydration product thereof, polyethylene glycol. Practically any hydrophobic compound having a hydroxyl, carboxyl, amino, or amido group with a reactive hydrogen atom can be condensed with ethylene oxide, or its polyhydration adducts, or its mixtures with alkoxylenes such as propylene oxide to form a nonionic surface-active agent. The length of the hydrophilic polyoxyalkylene moiety which is condensed with any particular hydrophobic compound can be readily adjusted to yield a water dispersible or water soluble compound having the desired degree of balance between hydrophilic and hydrophobic properties. Useful nonionic surfactants include:

Block polyoxypropylene-polyoxyethylene polymeric compounds based upon propylene glycol, ethylene glycol, glycerol, trimethylolpropane, and ethylenediamine as the initiator reactive hydrogen compound (1). Examples of polymeric compounds made from a sequential propoxylation and ethoxylation of initiator are commercially available. One class of compounds is difunctional (two reactive hydrogens) compounds formed by condensing ethylene oxide with a hydrophobic base formed by the addition of propylene oxide to the two hydroxyl groups of propylene glycol. This hydrophobic portion of the molecule weighs from about 1,000 to about 4,000. Ethylene oxide is then added to sandwich this hydrophobe between hydrophilic groups, controlled by length to constitute from about 10% by weight to about 80% by weight of the final molecule. Another class of compounds are tetra-flinctional block copolymers derived from the sequential addition of propylene oxide and ethylene oxide to ethylenediamine. The molecular weight of the propylene oxide hydrotype ranges from about 500 to about 7,000; and, the hydrophile, ethylene oxide, is added to constitute from about 10% by weight to about 80% by weight of the molecule.

Condensation products of one mole of alkyl phenol wherein the alkyl chain, of straight chain or branched chain configuration, or of single or dual alkyl constituent, contains from about 8 to about 18 carbon atoms with from about 3 to about 50 moles of ethylene oxide (2). The alkyl group can, for example, be represented by diisobutylene, di-amyl, polymerized propylene, iso-octyl, nonyl, and di-nonyl. These surfactants can be polyethylene, polypropylene, and polybutylene oxide condensates of alkyl phenols. Examples of commercial compounds of this chemistry are available on the market under the trade names Igepal® and Triton®.

Condensation products of one mole of a saturated or unsaturated, straight or branched chain alcohol having from about 6 to about 24 carbon atoms with from about 3 to about 50 moles of ethylene oxide (3). The alcohol moiety can consist of mixtures of alcohols in the above delineated carbon range or it can consist of an alcohol having a specific number of carbon atoms within this range. Condensation products of one mole of saturated or unsaturated, straight or branched chain carboxylic acid having from about 8 to about 18 carbon atoms with from about 6 to about 50 moles of ethylene oxide (4). The acid moiety can consist of mixtures of acids in the above defined carbon atoms range or it can consist of an acid having a specific number of carbon atoms within the range.

In addition to ethoxylated carboxylic acids, commonly called polyethylene glycol esters, other alkanoic acid esters formed by reaction with glycerides, glycerin, and polyhydric (saccharide or sorbitan/sorbitol) alcohols have application in this invention for specialized embodiments, particularly indirect food additive applications. All of these ester moieties have one or more reactive hydrogen sites on their molecule which can undergo further acylation or ethylene oxide (alkoxide) addition to control the hydrophilicity of these substances. Care must be exercised when adding these fatty ester or acylated carbohydrates to compositions of the present invention containing amylase and/or lipase enzymes because of potential incompatibility.

Examples of Nonionic Low Foaming Surfactants Include

Compounds from (1) which are modified, essentially reversed, by adding ethylene oxide to ethylene glycol to provide a hydrophile of designated molecular weight; and, then adding propylene oxide to obtain hydrophobic blocks on the outside (ends) of the molecule. The hydrophobic portion of the molecule weighs from about 1,000 to about 3,100 with the central hydrophile including 10% by weight to about 80% by weight of the final molecule. Exemplary surfactants can be produced by the sequential addition of ethylene oxide and propylene oxide to ethylenediamine. The hydrophobic portion of the molecule weighs from about 2,100 to about 6,700 with the central hydrophile including 10% by weight to 80% by weight of the final molecule.

Compounds from groups (1), (2), (3) and (4) which are modified by "capping" or "end blocking" the terminal hydroxy group or groups (of multi-functional moieties) to reduce foaming by reaction with a small hydrophobic molecule such as propylene oxide, butylene oxide, benzyl chloride; and, short chain fatty acids, alcohols or alkyl halides containing from 1 to about 5 carbon atoms; and mixtures thereof. Also included are reactants such as thionyl chloride which convert terminal hydroxy groups to a chloride group. Such modifications to the terminal hydroxy group may lead to all-block, block-heteric, heteric-block or all-heteric nonionics.

Additional Examples of Effective Low Foaming Nonionics Include

The alkylphenoxypolyethoxyalkanols of U.S. Pat. No. 2,903,486 issued Sep. 8, 1959 to Brown et al. and represented by the formula

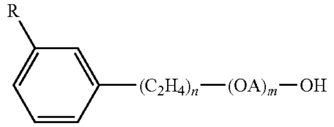

in which R is an alkyl group of 8 to 9 carbon atoms, A is an alkylene chain of 3 to 4 carbon atoms, n is an integer of 7 to 16, and m is an integer of 1 to 10.

The polyalkylene glycol condensates of U.S. Pat. No. 3,048,548 issued Aug. 7, 1962 to Martin et al. having alternating hydrophilic oxyethylene chains and hydrophobic oxypropylene chains where the weight of the terminal hydrophobic chains, the weight of the middle hydrophobic unit and the weight of the linking hydrophilic units each represent about one-third of the condensate.

The defoaming nonionic surfactants disclosed in U.S. Pat. No. 3,382,178 issued May 7, 1968 to Lissant et al. having the general formula $Z[(OR)_nOH]_z$ wherein Z is alkoxylatable material, R is a radical derived from an alkylene oxide which can be ethylene and propylene and n is an integer from, for example, 10 to 2,000 or more and z is an integer determined by the number of reactive oxyalkylatable groups.

The conjugated polyoxyalkylene compounds described in U.S. Pat. No. 2,677,700, issued May 4, 1954 to Jackson et al. corresponding to the formula $Y(C_3H_6O)_n(C_2H_4O)_mH$ wherein Y is the residue of organic compound having from about 1 to 6 carbon atoms and one reactive hydrogen atom, n has an average value of at least about 6.4, as determined by hydroxyl number and m has a value such that the oxyethylene portion constitutes about 10% to about 90% by weight of the molecule.

The conjugated polyoxyalkylene compounds described in U.S. Pat. No. 2,674,619, issued Apr. 6, 1954 to Lundsted et al. having the formula $Y[(C_3H_6O_n(C_2H_4O)_mH]_x$ wherein Y is the residue of an organic compound having from about 2 to 6 carbon atoms and containing x reactive hydrogen atoms in which x has a value of at least about 2, n has a value such that the molecular weight of the polyoxypropylene hydrophobic base is at least about 900 and m has value such that the oxyethylene content of the molecule is from about 10% to about 90% by weight. Compounds falling within the scope of the definition for Y include, for example, propylene glycol, glycerine, pentaerythritol, trimethylolpropane, ethylenediamine and the like. The oxypropylene chains optionally, but advantageously, contain small amounts of ethylene oxide and the oxyethylene chains also optionally, but advantageously, contain small amounts of propylene oxide.

Additional conjugated polyoxyalkylene surface-active agents which are advantageously used in the compositions of this invention correspond to the formula: $P[(C_3H_6O)_n(C_2H_4O)_mH]_x$ wherein P is the residue of an organic compound having from about 8 to 18 carbon atoms and containing x reactive hydrogen atoms in which x has a value of 1 or 2, n has a value such that the molecular weight of the polyoxyethylene portion is at least about 44 and m has a value such that the oxypropylene content of the molecule is from about 10% to about 90% by weight. In either case the oxypropylene chains may contain optionally, but advantageously, small amounts of ethylene oxide and the oxyethylene chains may contain also optionally, but advantageously, small amounts of propylene oxide.

Polyhydroxy fatty acid amide surfactants suitable for use in the present compositions include those having the structural formula $R_2CON_{R1}Z$ in which: R1 is H, $C_1$-$C_4$ hydrocarbyl, 2-hydroxy ethyl, 2-hydroxy propyl, ethoxy, propoxy group, or a mixture thereof; $R_2$ is a $C_5$-$C_{31}$ hydrocarbyl, which can be straight-chain; and Z is a polyhydroxyhydrocarbyl having a linear hydrocarbyl chain with at least 3 hydroxyls directly connected to the chain, or an alkoxylated derivative (preferably ethoxylated or propoxylated) thereof. Z can be derived from a reducing sugar in a reductive amination reaction; such as a glycityl moiety.

The alkyl ethoxylate condensation products of aliphatic alcohols with from about 0 to about 25 moles of ethylene oxide are suitable for use in the present compositions. The alkyl chain of the aliphatic alcohol can either be straight or branched, primary or secondary, and generally contains from 6 to 22 carbon atoms.

The ethoxylated $C_6$-$C_{18}$ fatty alcohols and $C_6$-$C_{18}$ mixed ethoxylated and propoxylated fatty alcohols are suitable surfactants for use in the present compositions, particularly those that are water soluble. Suitable ethoxylated fatty alcohols include the $C_6$-$C_{18}$ ethoxylated fatty alcohols with a degree of ethoxylation of from 3 to 50.

Suitable nonionic alkylpolysaccharide surfactants, particularly for use in the present compositions include those disclosed in U.S. Pat. No. 4,565,647, Llenado, issued Jan. 21, 1986. These surfactants include a hydrophobic group containing from about 6 to about 30 carbon atoms and a polysaccharide, e.g., a polyglycoside, hydrophilic group containing from about 1.3 to about 10 saccharide units. Any reducing saccharide containing 5 or 6 carbon atoms can be used, e.g., glucose, galactose and galactosyl moieties can be substituted for the glucosyl moieties. Optionally the hydrophobic group is attached at the 2-, 3-, 4-, etc. positions thus giving a glucose or galactose as opposed to a glucoside or galactoside. The intersaccharide bonds can be, e.g., between the one position of the additional saccharide units and the 2-, 3-, 4-, and/or 6-positions on the preceding saccharide units.

Fatty acid amide surfactants suitable for use the present compositions include those having the formula: $R_6CON(R_7)_2$ in which $R_6$ is an alkyl group containing from 7 to 21 carbon atoms and each $R_7$ is independently hydrogen, $C_1$-$C_4$ alkyl, $C_1$-$C_4$ hydroxyalkyl, or $—(C_2H_4O)_xH$, where x is in the range of from 1 to 3.

A useful class of non-ionic surfactants includes the class defined as alkoxylated amines or, most particularly, alcohol alkoxylated/aminated/alkoxylated surfactants. These nonionic surfactants may be at least in part represented by the general formulae: $R^{20}$-$(PO)_SN$-$(EO)_tH$, $R^{20}$-$(PO)_SN$-$(EO)_tH(EO)_tH$, and $R^{20}$-$N(EO)_tH$; in which $R^{20}$ is an alkyl, alkenyl or other aliphatic group, or an alkyl-aryl group of from 8 to 20, preferably 12 to 14 carbon atoms, EO is oxyethylene, PO is oxypropylene, s is 1 to 20, preferably 2-5, t is 1-10, preferably 2-5, and u is 1-10, preferably 2-5. Other variations on the scope of these compounds may be represented by the alternative formula: $R^{20}$-$(PO)_V$-$N[(EO)_wH][(EO)_zH]$ in which $R^{20}$ is as defined above, v is 1 to 20 (e.g., 1, 2, 3, or 4 (preferably 2)), and w and z are independently 1-10, preferably 2-5.

Preferred nonionic surfactants for the compositions include alcohol alkoxylates, EO/PO block copolymers, alkylphenol alkoxylates, and the like.

The treatise *Nonionic Surfactants*, edited by Schick, M. J., Vol. 1 of the Surfactant Science Series, Marcel Dekker, Inc., New York, 1983 is an excellent reference on the wide variety of nonionic compounds generally employed in the practice of the present invention. A typical listing of nonionic classes, and species of these surfactants, is given in U.S. Pat. No. 3,929,678 issued to Laughlin and Heuring on Dec. 30, 1975. Further examples are given in "Surface Active Agents and detergents" (Vol. I and II by Schwartz, Perry and Berch).

Water Conditioning Agents

In some embodiments, the compositions of the present invention can include a water conditioning agent. Carboxylates such as citrate, tartrate or gluconate are suitable. Water conditioning polymers can be used as non-phosphorus containing builders. Exemplary water conditioning polymers include, but are not limited to: polycarboxylates. Exemplary polycarboxylates that can be used as builders and/or water conditioning polymers include, but are not limited to: those having pendant carboxylate ($—CO_2—$) groups such as polyacrylic acid, maleic acid, maleic/olefin copolymer, sulfonated copolymer or terpolymer, acrylic/maleic copolymer, polymethacrylic acid, acrylic acid-methacrylic acid copolymers, hydrolyzed polyacrylamide, hydrolyzed polymethacrylamide, hydrolyzed polyamide-methacrylamide copolymers, hydrolyzed polyacrylonitrile, hydrolyzed polymethacrylonitrile, and hydrolyzed acrylonitrile-methacrylonitrile copolymers. For a further discussion of water conditioning agents, see Kirk-Othmer, Encyclopedia of Chemical Technology, Third Edition, volume 5, pages 339-366 and volume 23, pages 319-320, the disclosure of which is incorporated by reference herein. The compositions may include a water conditioning agent in an amount in the range of up to about 15 wt-%, up to about 10 wt-%, or up to about 5 wt-%.

Acidulants

In some embodiments, the compositions of the present invention can include an acidulant or other pH buffer, and the like. The compositions can be formulated such that during use in aqueous operations, for example in aqueous cleaning operations, the rinse water will have a desired pH. For example, compositions designed for use in rinsing may be formulated such that during use in aqueous rinsing operation the rinse water will have a pH in the range of 8.5 or below, 8.3 or below, or 7 or below. In other aspects, the pH is about 3 to about 5, or in the range of about 5 to about 8.5. Liquid product formulations in some embodiments have a pH in the range of about 2 to about 4, or in the range of about 4 to about 9. Techniques for controlling pH at recommended usage levels include the use of buffers, alkali, acids, etc., and are well known to those skilled in the art. One example of a suitable acid for controlling pH includes citric acid, hydrochloric acid, phosphoric acid, sodium bicarbonate, protonated forms of phosphonates, sodium benzoate and gluconic acid. The compositions may include an acidulant in an amount in the range of up to about 20 wt-%, up to about 15 wt-%, up to about 10 wt-%, or up to about 5 wt-%.

Chelating/Sequestering Agents

In some embodiments, the compositions of the present invention can include one or more chelating/sequestering agents, which may also be referred to as a builder. A chelating/sequestering agent may include, for example an aminocarboxylic acid, aminocarboxylates and their derivatives, a polyacrylate, and mixtures and derivatives thereof. In general, a chelating agent is a molecule capable of coordinating (i.e., binding) the metal ions commonly found in natural water to prevent the metal ions from interfering with the action of the other ingredients of a wetting agent or other cleaning composition. The chelating/sequestering agent may also function as a threshold agent when included in an effective amount.

Some examples of polymeric polycarboxylates suitable for use as sequestering agents include those having a pendant carboxylate (—$CO_2$) groups and include, for example, polyacrylic acid, maleic/olefin copolymer, acrylic/maleic copolymer, polymethacrylic acid, acrylic acid-methacrylic acid copolymers, hydrolyzed polyacrylamide, hydrolyzed polymethacrylamide, hydrolyzed polyamide-methacrylamide copolymers, hydrolyzed polyacrylonitrile, hydrolyzed polymethacrylonitrile, hydrolyzed acrylonitrile-methacrylonitrile copolymers, and the like. The composition may include an aminocarboxylate or its derivatives, including for example sodium aminocarboxylate or a biodegradable aminocarboxylate or derivative thereof.

In some embodiments, the compositions can include in the range of up to about 70 wt-%, or in the range of about 0.1 to about 60 wt-%, or about 0.1 to about 5.0 wt-%, of a chelating/sequestering agent. In some embodiments, the compositions of the invention include less than about 1.0 wt-%, or less than about 0.5 wt-% of a chelating/sequestering agent. In other embodiments the compositions may include a chelant/sequestering agent in an amount in the range of up to about 10 wt-%, or up to about 5 wt-%.

Use Solutions

The hard surface rinse aid compositions are liquid products. The compositions may include concentrate compositions or may be diluted to form use compositions. In general, a concentrate refers to a composition that is intended to be diluted with water to provide a use solution that contacts an object to provide the desired cleaning, rinsing, or the like. The composition that contacts the articles to be washed can be referred to as a concentrate or a use composition (or use solution) dependent upon the formulation employed for methods of use.

In an aspect, the dilution of the compositions does not include deionized water and/or softened water. Preferably a water source having hardness ions is employed. At least 5 grains per gallon (gpg) hardness water is preferred.

A use solution may be prepared from the concentrate by diluting the concentrate with water at a dilution ratio that provides a use solution having desired detersive properties. The water that is used to dilute the concentrate to form the use composition can be referred to as water of dilution or a diluent, and can vary from one location to another. The typical dilution factor is between approximately 1 and approximately 10,000. In an embodiment, the concentrate is diluted at a ratio of between about 1:2 and about 1:100 concentrate to water.

Sufficient water for dilution to provide between about 1 to 5% use solution, or between a 1 to 3% use solution is preferred for various applications of use. In an embodiment, the composition is preferably provided at a use solution level of at least about 1% (10,000 ppm), at least about 2% (20,000 ppm), or at least about 3% (30,000 ppm), from about 1% to about 3%, or greater. In another embodiment, the surfactant system employed in the hard surface rinse aid composition is preferably provided at a use solution level based on active concentration of at least about 1,000 ppm to about 10,000 ppm, or from about 1,000 ppm to about 5,000 ppm. In an exemplary embodiment of compositions described herein, the surfactant system employed in the hard surface rinse aid composition is provided at an active concentration of between about 1,000 ppm to about 5,000 ppm at a 1% use concentration, at a 2% use concentration, or at a 3% use concentration of the concentrate composition.

Without being limited to a particular mechanism of action, the high level of the hard surface cleaning composition in a use solution presents challenges which the surfactant system and acidic preservative composition beneficially overcome. The high concentration of surfactants presents foaming challenges that the combination of the acidic preservative system in combination with the surfactants can overcome. These challenges are overcome in a composition that is free of detergent alkalinity. The hard surface rinse aid compositions do not include a detergent alkalinity source. Moreover, the hard surface rinse aid compositions are substantially more concentrated than other conventional rinse aid compositions, including rinse aids for ware washing, which are generally used at concentrations less than about 500 ppm, and most often between about 10 ppm and 450 ppm of total actives, and less than about 150 ppm or even 100 ppm of surfactant actives.

In an aspect, the use solution of the compositions have a pH between about 4 and about 7, or at least about 4 to about 7, or at least about 5 to about 7. Beneficially the water source (that is not a softened water) buffers the use solution to maintain the pH between about 4 and about 7 at a use solution of at least about 1%, or at least about 2%, or at least about 3%.

Methods of Use

The surfactant systems and hard surface rinse aid compositions employing the same can be used for a variety of applications. The compositions can be applied to a variety of hard surfaces, including those in kitchens, bathrooms, factories, hospitals, offices, and preferably to processing of hard surface parts in need of coating, such as painting. Suitable hard surfaces include, for example, automotive parts.

Automotive parts can be made from a variety of materials including, for example, plastics and plastics containing metal parts, wherein the metals may include aluminum requiring aluminum compatibility. As aluminum is a soft metal the compositions require aluminum compatibility. As referred to herein, aluminum compatibility ensures that any degree of etching that occurs on the surface does not cause corrosion and/or significant weight loss (as a result of etching of the aluminum). Although certain applications of use benefit from acidic compositions which can cause etching on the surface that enables the adherence of a coating, such as paint, corrosion of the surface is not desired.

The compositions can be used in a variety of applications where a clean, spot-free, film-free, dry surface is required. For example, in some embodiments, the compositions can be formulated for use in cleaning and rinsing surfaces in need of coating, such as with paint. In a preferred embodiment, the contacting of the hard surfaces (e.g. automotive parts) with the use solution of the composition precedes painting of the surface to provide a clean and rinsed hard surface.

In an aspect, the surfactant systems and compositions employing the surfactant systems are employed in low temperature applications. As referred to herein, low temperature includes those at or below about 145° F. In an embodiment, the temperature of the rinse water is up to about 145° F., preferably in the range of 125° F. to 145° F. As referred to herein, "low temperature" refers to those rinse water temperatures below about 145° F.

The surfactant systems and compositions employing the surfactant systems can contact the surface or article by numerous methods for applying a composition, such as spraying the composition, immersing the object in the composition, or a combination thereof. A use concentration of the compositions can be applied to or brought into contact with an article by any conventional method or apparatus for applying a cleaning composition to an object. For example, the object can be sprayed with, and/or immersed in the use solution made from the composition. The use solution of the composition can be sprayed onto a surface, the use solution of the composition can be caused to flow over the surface, or the surface can be dipped into the use solution of the composition. Contacting can be manual or by machine.

In an exemplary aspect, the methods can include use of an assembly-style application of the compositions. In an aspect, the use solution of the compositions can be sprayed while the parts are moving through a tunnel (or other site) spraying the formulations. This process can be manual, partially or fully automated. In an exemplary embodiment, the process can take place on a stationary or moving surface, such as a conveyor belt that brings parts through a sprayer.

In another aspect, the use solution of the composition can be dosed into a tank or other holding means and the parts are submerged therein.

The contacting of the surface with the use solution of the composition can be part of a multi-part process or a multi-phase system. In an embodiment, the hard surface rinse aid composition is contacted to a surface in need of cleaning and rinsing before a coating or a paint is applied to the surface. Exemplary steps in the process or system employing the hard surface rinse aid composition may include an initial prewash or hot wash step, a washing step with additional soaps and/or cleaners, one or more rinse steps, and a drying step.

The contacting of the surface with the use solution of the composition can be for about 60 seconds to a few hours, from a few minutes to a few hours, or from about 10 minutes to about 60 minutes.

When used in these applications, the surfactant systems provide effective sheeting action, low foaming properties and fast drying. In some aspects, the surfactant system and compositions employing the same dries a surface within about 30 seconds to a few minutes, or within about 30 to about 90 seconds after the aqueous solution is removed (i.e. the surface is removed from a tank where it is submerged in the composition). Beneficially, the hard surface rinse aid compositions provide enhanced dynamic contact angle providing efficient sheeting without leaving debris on the treated surface even with the high use concentrations employed. In an aspect, the compositions employing the surfactant systems reduce the contact angles of the composition on a plastic surface by between about 5° to about 10°, or preferably between about 5° to about 20°, or more preferably between about 10° to about 25° as compared to the contact angle of a commercially available rinse aid composition. As disclosed herein, the more a composition will induce sheeting, ensure lack of debris remaining on the treated surface despite the high concentration of the surfactant system employed, and confirms a lack of filming on the surface.

In applications of use a concentration of the surfactant systems can be employed at various concentrations. In an exemplary embodiment a use concentration of at least about 1%, at least about 2% or at least about 3% is employed (10,000 ppm, 20,000 ppm, 30,000 ppm respectively).

All publications and patent applications in this specification are indicative of the level of ordinary skill in the art to which this invention pertains. All publications and patent applications are herein incorporated by reference to the same extent as if each individual publication or patent application was specifically and individually indicated as incorporated by reference.

EXAMPLES

Embodiments of the present invention are further defined in the following non-limiting Examples. It should be understood that these Examples, while indicating certain embodiments of the invention, are given by way of illustration only. From the above discussion and these Examples, one skilled in the art can ascertain the essential characteristics of this invention, and without departing from the spirit and scope thereof, can make various changes and modifications of the embodiments of the invention to adapt it to various usages and conditions. Thus, various modifications of the embodiments, in addition to those shown and described herein, will be apparent to those skilled in the art from the foregoing description. Such modifications are also intended to fall within the scope of the appended claims. Exemplary components included in formulations of the Examples include:

Surfactant I: C10-C16 alcohol alkoxylate, nonionic surfactant;

Surfactant II: Isotridecyl alcohol 6 mole ethoxylate, nonionic surfactant;

Surfactant III: EO/PO reverse block copolymer, nonionic surfactant;

SXS 40%: sodium xylene sulfonate;

Dequest 2010: hydroxy-ethylidene disphosphonic acid; and

Glutaraldehyde 50%: glutaral, 1,5-pentanedial, germicide.

Example 1

Glewwe foam evaluation was conducted for the experimental formulation of Table 3. No soils were used in the test. The composition was evaluated at both a 1% and 3% use concentration range.

TABLE 3

| | Description | Quantity (wt-%) |
|---|---|---|
| Water | Water Deionized TNK | 57.495-62.495 |
| Surfactant | Surfactant I | 0.75 |
| System | Surfactant II | 0.75 |
| | Surfactant III | 12 |
| Acidic | SXS 40% | 23-28 |
| Preservation | Diphosphonic acid | 1 |
| Composition | Glutaraldehyde 50% DRM | 0.005 |

The hard surface rinse aid composition was tested in a Glewwe foam machine at different temperatures. The composition was added to the circulating water, and the foam generated was measured initially, and then again at 15 seconds, one minute intervals up to five minutes under agitation. A low foaming product with high use concentration (both 1% and 3%) is desirable.

The foam level in the machine was noted. In reference to the results shown in Table 4, the amount of foam in inches indicates how much foam remains, wherein a minimal amount is preferred at all time points up to 5 minutes. Foam that is less than one half of an inch and that is unstable and breaks to nothing soon after the machine is shut off is acceptable, but no foam is best. Table 4 shows the Glewwe measurements.

TABLE 4

| DOE Run | Use Conc (%) | Temp ° F. | SXS/H2O ratio | Target Dose (g) | Actual Dose (g) | Water Hardness (grains) | Foam Height - Initial (in) | Foam Height 15 Sec (in) | Foam Height 1 Min (in) | Foam Height 2 min (in) | Foam Height 3 min (in) | Foam Height 4 min (in) | Foam Height 5 min (in) |
|---|---|---|---|---|---|---|---|---|---|---|---|---|---|
| 1 | 3 | 145 | 0.368 | 90 | 89.99 | 5 | 0.25 | 0.25 | 0 | 0 | 0 | 0 | 0 |
| 2 | 3 | 145 | 0.368 | 90 | 90.01 | 5 | 0.25 | 0.25 | 0 | 0 | 0 | 0 | 0 |
| 3 | 1 | 145 | 0.487 | 30 | 30.02 | 5 | 0 | 0 | 0 | 0 | 0 | 0 | 0 |
| 4 | 3 | 125 | 0.487 | 90 | 90.03 | 5 | 0.5 | 0.5 | 0.25 | 0.25 | 0 | 0 | 0 |
| 5 | 1 | 125 | 0.487 | 30 | 30.01 | 5 | 0 | 0 | 0 | 0 | 0 | 0 | 0 |
| 6 | 3 | 145 | 0.487 | 90 | 89.99 | 5 | 0.25 | 0 | 0 | 0 | 0 | 0 | 0 |
| 7 | 1 | 125 | 0.487 | 30 | 29.98 | 5 | 0.25 | 0.25 | 0 | 0 | 0 | 0 | 0 |
| 8 | 1 | 125 | 0.368 | 30 | 29.99 | 5 | 0 | 0 | 0 | 0 | 0 | 0 | 0 |
| 9 | 1 | 145 | 0.368 | 30 | 29.98 | 5 | 0 | 0 | 0 | 0 | 0 | 0 | 0 |
| 10 | 3 | 125 | 0.368 | 90 | 90.02 | 5 | 0.5 | 0.25 | 0.25 | 0 | 0 | 0 | 0 |
| 11 | 3 | 145 | 0.487 | 90 | 89.98 | 5 | 0.25 | 0 | 0 | 0 | 0 | 0 | 0 |
| 12 | 3 | 125 | 0.368 | 90 | 89.99 | 5 | 0.5 | 0.5 | 0.25 | 0 | 0 | 0 | 0 |

The results show the surfactant packages in the hard surface rinse aid compositions provide the beneficial low- or no-foam profiles under the testing conditions.

Additional Glewwe foam evaluation was conducted for a commercial control formulation shown in Table 5 (cleaner). A commercial control Formula 1 (acidic cleaning composition with phosphates and sulfates) was evaluated and the results are shown of Table 6. The composition was also evaluated at both a 1% and 3% use concentration range to minor the concentration of the evaluation in Table 4.

TABLE 5

| Commercial Formula I Acidic Cleaner | |
|---|---|
| WT % | Disclosed Name |
| 78.71 | Water |
| 17.54 | Phosphates, Phosphate Ester Salt and Phosphoric acid |
| 2.90 | Mod. Polyethoxylated alcohol |
| 0.80 | Sodium Xylene Sulfonate |
| 0.05 | Impurities |

compositions desire a pH between about 4 and about 7 at a use concentration between about 1%-3% and the anionic hydrotrope and/or aluminum compatible preservative can greatly impact the pH. The following preservatives were evaluated to either replace or decrease the concentration of a phosphonic acid aluminum compatible preservative to ensure desired pH in use solution: benzoic acid and sorbic acid. The results indicate that benzoic acid formulations had pH below about 4 using DI water and the sorbic acid did not go into solution. The evaluation of benzoic acid using 5 gpg water resulted in pH 6.17 at 1%, 5.26 at 2% and 4.43 at 3%, all meeting the threshold of a pH 4-7 at use concentrations when using 5 gpg water instead of DI water. Without being limited to a particular theory of the invention, the pH is impacted by the ion concentration differences in DI (0 gpg) and 5 gpg water, where the DI water is acting like a strong solvent and pulling the H+ ions out of the acid leading to instability and a lower pH. In comparison, as the 5 gpg water is more saturated with ions the acid is less likely to kick out. This is summarized in Table 7.

TABLE 6

| Use Conc (%) | Temp (F.) | Target Dose (g) | Actual Dose (g) | Water Hardness (grains) | Foam Height - Initial (in) | Foam Height - 15 sec (in) | Foam Height - 1 min (in) | Foam Height - 2 min (in) | Foam Height - 3 min (in) | Foam Height - 4 min (in) | Foam Height - 5 min (in) |
|---|---|---|---|---|---|---|---|---|---|---|---|
| 1 | 125 | 30 | 29.99 | 5 | 0 | 0 | 0 | 0 | 0 | 0 | 0 |
| 3 | 145 | 90 | 90.03 | 5 | 0 | 0 | 0 | 0 | 0 | 0 | 0 |
| 1 | 145 | 30 | 30.00 | 5 | 0 | 0 | 0 | 0 | 0 | 0 | 0 |
| 3 | 125 | 90 | 90.04 | 5 | 1 | 0.5 | 0 | 0 | 0 | 0 | 0 |

The evaluated formulation in Table 6 employed the Commercial Formula 1 Control (Table 5), at both 1% or 3% use solutions, and at 125° F. and 145° F.

The results show that substantially similar results for a low-foaming composition are achieved by the hard surface rinse aid composition of Table 3. The pH range for the evaluated formulas at use concentrations were too low and demonstrate a need for modifications of the formulations.

Example 2

Additional acidic preservative compositions were evaluated for use in the hard surface rinse aid composition. The

TABLE 7

| Acidic Preservative in Formula | Use Concentration (%) | Water Hardness | pH |
|---|---|---|---|
| Benzoic acid | 1 | 0-grain | 3.59 |
| Benzoic acid | 2 | 0-grain | 3.44 |
| Benzoic acid | 3 | 0-grain | 3.36 |
| Benzoic acid | 1 | 5-grain | 6.17 |
| Benzoic acid | 2 | 5-grain | 5.26 |
| Benzoic acid | 3 | 5-grain | 4.43 |

Example 3

Monosodium citrate was evaluated in combination with the preservative Kathon. The evaluated formulation is shown in Table 8. The pH of the formulations were then measured using different types of water as shown in Tables 9A-9B.

TABLE 8

| Quantity (wt-%) | Description |
|---|---|
| 57.5 | Water Deionized TNK |
| 0.75 | Surfactant I |
| 0.75 | Surfactant II |
| 12 | Surfactant III |
| 23 | SXS 40% |
| 5 | Monosodium Citrate |
| 1 | Kathon |

TABLE 9A

| Use Concentration - Diluted with DI $H_2O$ | pH |
|---|---|
| 1% | 3.76 |
| 2% | 3.73 |
| 3% | 3.71 |
| RTU solution | 3.74 |

TABLE 9B

| Use Concentration - Diluted with 5-grain $H_2O$ | pH |
|---|---|
| 1% | 4.42 |
| 2% | 4.14 |
| 3% | 4.00 |
| RTU solution | 3.74 |

Beneficially, the monosodium citrate as the aluminum compatible preservative achieved a wider range of pH at use solutions and can provide flexibility to alter concentrations based upon the type of hard surface to be treated.

Example 4

Gluconic acid was evaluated in combination with the preservative Kathon as shown in Table 10 and pH using 5 gpg water is shown in Table 11.

TABLE 10

| Quantity (wt-%) | Description |
|---|---|
| 57.5 | Water Deionized TNK |
| 0.75 | Surfactant I |
| 0.75 | Surfactant II |
| 12 | Surfactant III |
| 23 | SXS 40% |
| 5 | Gluconic Acid |
| 1 | Kathon |

TABLE 11

| Use Concentration - Diluted with 5-grain H2O | pH |
|---|---|
| 1% | 6.36 |
| 2% | 4.96 |
| 3% | 3.86 |
| RTU solution | 2.74 |

Beneficially, the gluconic acid as the aluminum compatible preservative achieved a wider range of pH at use solutions and can provide flexibility to alter concentrations based upon the type of hard surface to be treated.

Example 5

Based on the surprising results of the pH of use solutions changing based on use of 5 gpg water as opposed to DI water, the evaluated formulations having different acidic preservative compositions were again run with 5 gpg water. These are shown in Table 12 and FIG. 1.

TABLE 12

| Acid Type | Use Concentration (diluted with 5-grain H2O) | pH |
|---|---|---|
| Commercial Formula I (Control) | 1.00 | 3.97 |
| Commercial Formula I (Control) | 2.00 | 3.42 |
| Commercial Formula I (Control) | 3.00 | 3.29 |
| Dequest (0.5%) | 1.00 | 6.56 |
| Dequest (0.5%) | 2.00 | 6.26 |
| Dequest (0.5%) | 3.00 | 5.99 |
| Dequest (0.1%) | 1.00 | 6.88 |
| Dequest (0.1%) | 2.00 | 6.97 |
| Dequest (0.1%) | 3.00 | 6.83 |
| Benzoic (1%) | 1.00 | 6.17 |
| Benzoic (1%) | 2.00 | 5.26 |
| Benzoic (1%) | 3.00 | 4.43 |
| Monosodium Citrate (5%) | 1.00 | 4.42 |
| Monosodium Citrate (5%) | 2.00 | 4.14 |
| Monosodium Citrate (5%) | 3.00 | 4.00 |
| Gluconic (5%) | 1.00 | 6.36 |
| Gluconic (5%) | 2.00 | 4.96 |
| Gluconic (5%) | 3.00 | 3.86 |
| Kathon Only | 1.00 | 6.95 |
| Kathon Only | 2.00 | 7.06 |
| Kathon Only | 3.00 | 7.26 |

Figure 2:
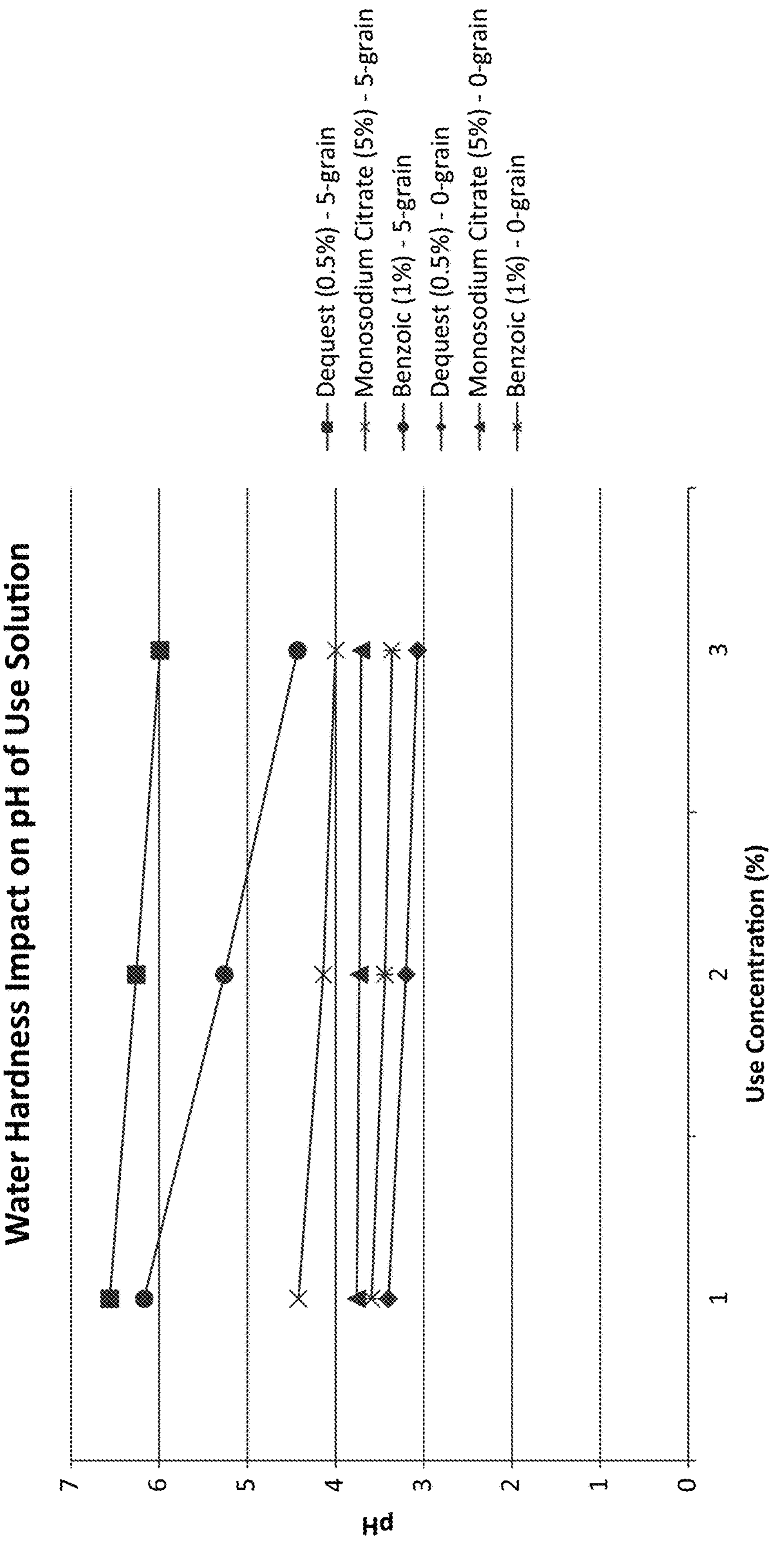
FIG. 2 shows a plot of the impact of water hardness on pH profiles for the hard surface rinse aid compositions evaluated herein, wherein compositions diluted with 5-grain water had higher pH (and stability) than compositions diluted with 0-grain water.

The comparison of the DI water and 5 gpg water on pH is shown in FIG. 2.

Example 6

Additional Glewwe testing was conducted using a hard surface rinse aid composition with an acidic preservation composition including only a preservative and not an acid shown in Tables 13 and 15. The foaming results are shown in Table 14 and 16.

TABLE 13

| | Description | Quantity (wt-%) |
|---|---|---|
| Water | Water Deionized TNK | 62.5 |
| Surfactant System | Surfactant I | 0.75 |
| | Surfactant II | 0.75 |
| | Surfactant III | 12 |
| Acidic Preservation Composition | SXS 40% | 23 |
| | Kathon | 1 |

TABLE 14

| Code | Use Conc. (% target g) | Actual (g) | Temp (° F.) | Water Hardness (grains) | Foam Height - Initial (in) | Foam Height - 15 sec (in) | Foam Height - 1 min (in) | Foam Height - 2 min (in) | Foam Height - 3 min (in) |
|---|---|---|---|---|---|---|---|---|---|
| Commercial Formula I (Control) | 3%, 90 g | 90.02 | 125 | 5 | 0.5 | 0.25 | 0 | | |
| Dequest (0.5%) | 3%, 90 g | 89.99 | 125 | 5 | 0.75 | 0.5 | 0.25 | 0.25 | 0 |
| Benzoic (1%) | 3%, 90 g | 90.05 | 125 | 5 | 0.75 | 0.5 | 0.25 | 0 | |
| Monosodium citrate (5%) | 3%, 90 g | 90.03 | 125 | 5 | 0.75 | 0.5 | 0 | | |
| Gluconic (5%) | 3%, 90 g | 90.04 | 125 | 5 | 1 | 0.75 | 0.25 | 0.25 | 0 |
| Kathon Only | 3%, 90 g | 89.98 | 125 | 5 | 0.5 | 0.25 | 0 | | |
| Commercial Formula I (Control) | 3%, 90 g | 90.03 | 125 | 5 | 0.75 | 0.25 | 0 | | |
| Dequest (0.5%) | 3%, 90 g | 90.04 | 125 | 5 | 0.75 | 0.5 | 0.25 | 0.25 | 0 |
| Benzoic (1%) | 3%, 90 g | 90.02 | 125 | 5 | 0.75 | 0.5 | 0.25 | 0 | |
| Monosodium citrate (5%) | 3%, 90 g | 89.97 | 125 | 5 | 0.75 | 0.5 | 0 | | |
| Gluconic (5%) | 3%, 90 g | 89.99 | 125 | 5 | 0.75 | 0.5 | 0.25 | 0.25 | 0 |
| Kathon Only | 3%, 90 g | 90.03 | 125 | 5 | 0.5 | 0 | | | |
| Commercial Formula I (Control) | 3%, 90 g | 90.02 | 145 | 5 | 0 | | | | |
| Dequest (0.5%) | 3%, 90 g | 90.00 | 145 | 5 | 0 | | | | |
| Benzoic (1%) | 3%, 90 g | 90.03 | 145 | 5 | 0 | | | | |
| Monosodium citrate (5%) | 3%, 90 g | 89.99 | 145 | 5 | 0 | | | | |
| Gluconic (5%) | 3%, 90 g | 90.04 | 145 | 5 | 0 | | | | |
| Kathon Only | 3%, 90 g | 90.01 | 145 | 5 | 0 | | | | |
| Commercial Formula I (Control) | 3%, 90 g | 90.02 | 145 | 5 | 0 | | | | |
| Dequest (0.5%) | 3%, 90 g | | 145 | 5 | | | | | |
| Benzoic (1%) | 3%, 90 g | 90.05 | 145 | 5 | 0 | | | | |
| Monosodium citrate (5%) | 3%, 90 g | | 145 | 5 | | | | | |
| Gluconic (5%) | 3%, 90 g | | 145 | 5 | | | | | |
| Kathon Only | 3%, 90 g | 90.05 | 145 | 5 | 0 | | | | |

TABLE 15

| Quantity | Description |
|---|---|
| 62.5 | Water Deionized TNK |
| 0.75 | Surfactant I |
| 0.75 | Surfactant II |
| 12 | Surfactant III |
| 23 | SXS 40% |
| 1 | Kathon |

TABLE 16

| Use Concentration - Diluted with 5-grain H2O | pH |
|---|---|
| 1% | 6.95 |
| 2% | 7.06 |
| 3% | 7.26 |
| RTU solution | 8.30 |

Figure 3:
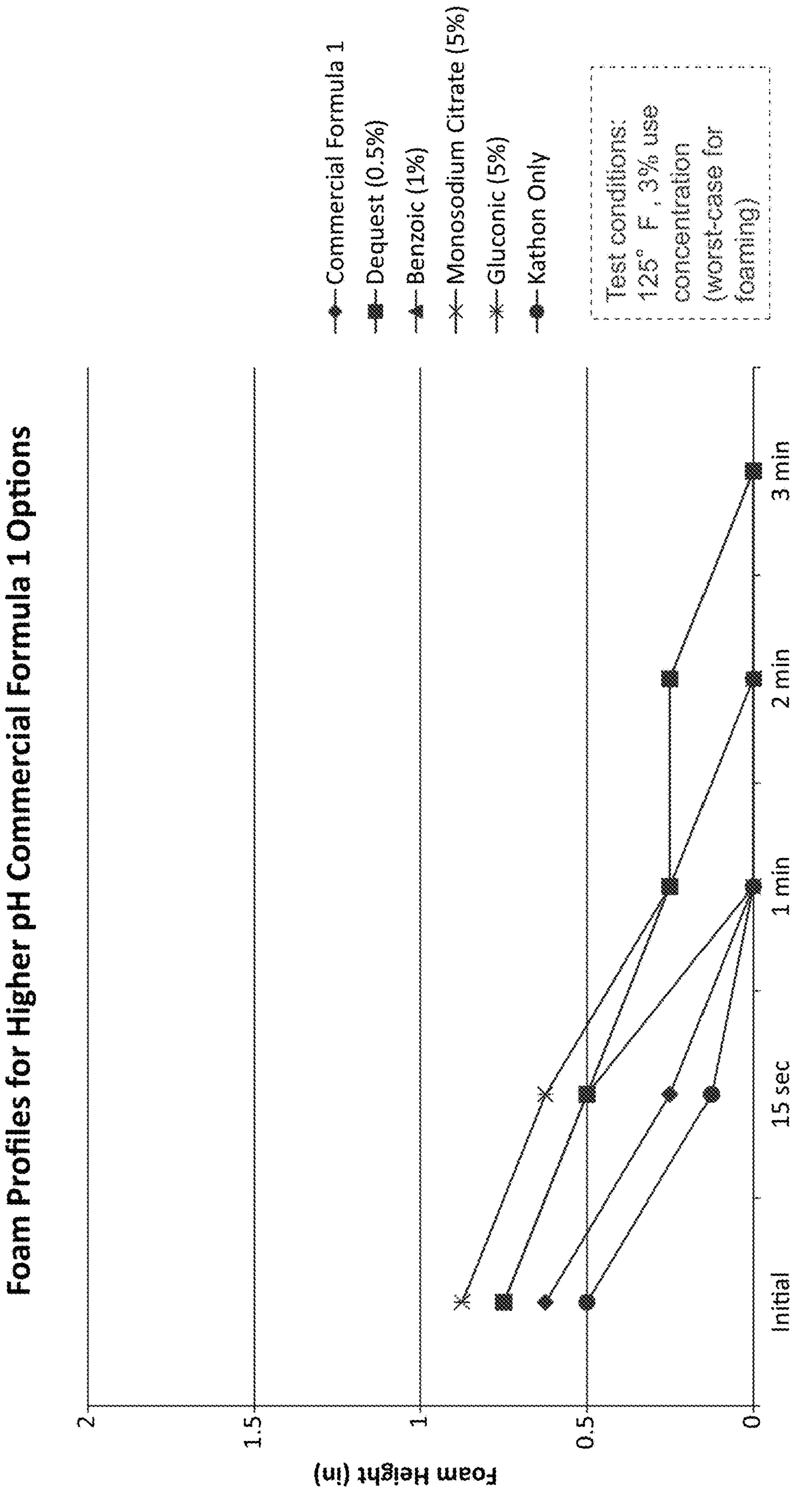
FIG. 3 shows a plot of foam profiles at 125° F. and 3% use concentration of using alternative weak acids as part of the acidic preservative composition to maintain a desired pH range at 1-3% use solution between about 4-7.

As shown in Table 14 and FIG. 3, all formulations demonstrated a small amount of foaming at 125° F. whereas no foaming occurred at 145° F. The formulations containing Dequest (0.5%) and Gluconic Acid (5%) took the longest to break.

Example 7

Testing of hard surface rinse aid compositions was completed at an automotive plastic panel location to compare cleaners and rinse aid compositions for efficacy in cleaning and rinsing surfaces before adhering paint coatings. The evaluated compositions were as follows in Table 17.

TABLE 17

| Panel Number | Wash Solution (3%) | Rinse Aid (0.01%) |
|---|---|---|
| 1 | None | Yes |
| 2 | Commercial Product II (Table 17) | Yes |

TABLE 17-continued

| Panel Number | Wash Solution (3%) | Rinse Aid (0.01%) |
|---|---|---|
| 3 | Commercial Formula I (Table 5A) | Yes |
| 4 | Hard Surface Rinse Aid Composition (Table 3) | Yes |
| 5 | Commercial Formula I (Table 5A) | No |
| 6 | Hard Surface Rinse Aid Composition (Table 3) | No |

Test Procedure:

1. Six plastic panels were taped to allow for handling of the panels during the test without adding oils and dirt. Only the bottom section of each panel was analyzed.
2. All panels were washed with 20 sprays of corresponding 3% wash solution of the evaluated hard surface rinse aid composition heated to 135° F. Next, all panels were rinsed with RO water. Finally, all panels except where noted were rinsed with 5 sprays of a 0.01% solution of the rinse formulation in Table 5B.
3. The panels were NOT blown off with compressed air.
4. All panels were placed in an oven at 180° F. for 15 minutes to evaporate the remaining water off the parts.
5. The panels were painted with white basecoat followed by clear coat and then dried in the oven according to actual plant conditions.

Figure 4A:
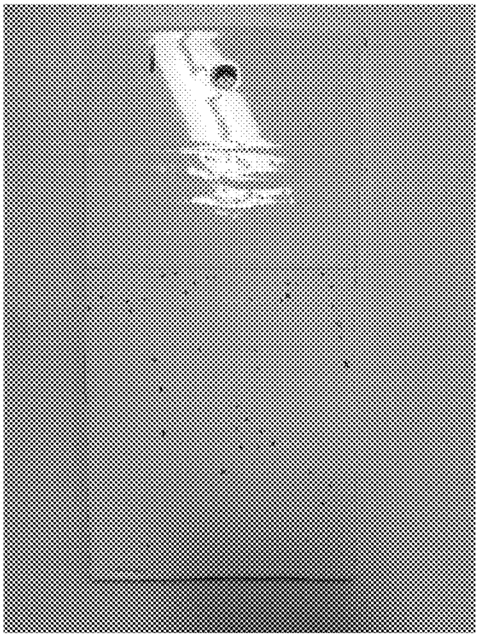
FIGS. 4A-4F show photographs of panels painted following cleaning and rinsing with various evaluated hard surface rinse aid compositions.

Results:

Panel 1 was highly contaminated with fish eyes as shown in FIG. 4A.

Figure 4B:
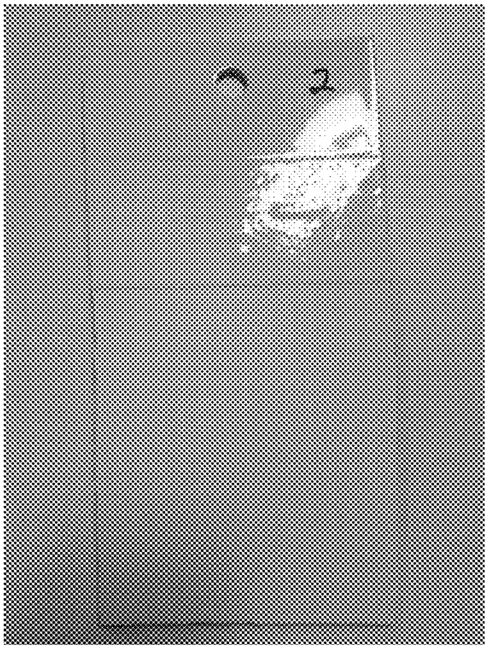

Panel 2 passed the test as shown in FIG. 4B.

Figure 4C:
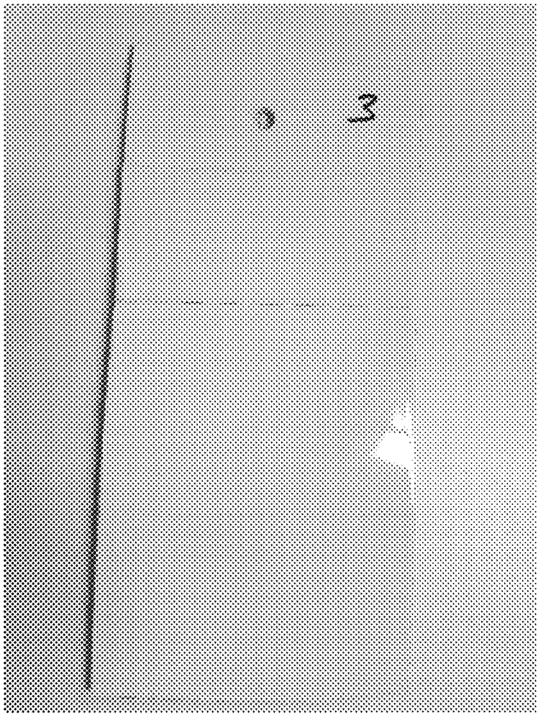

Panel 3 passed the test as shown in FIG. 4C.

Figure 4D:
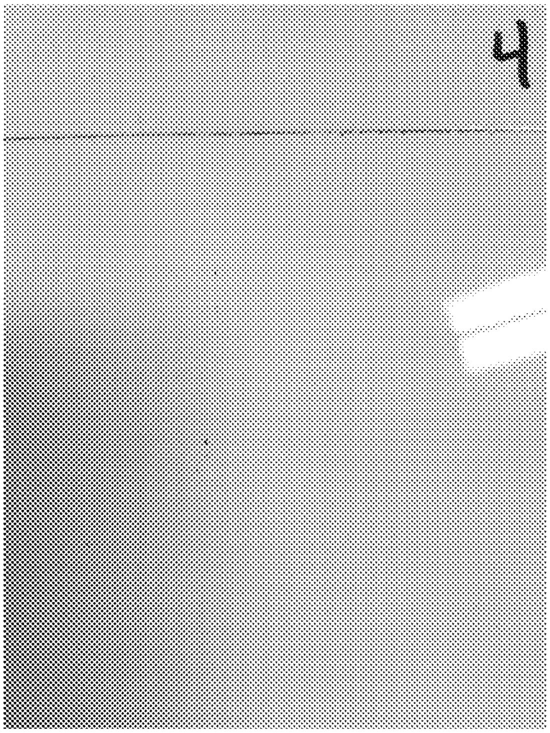

Panel 4 contained a small amount of surface contamination as shown in FIG. 4D. It was unknown why panel 4 failed, however, it was concluded that the contamination was due to process and not the composition.

Figure 4E:
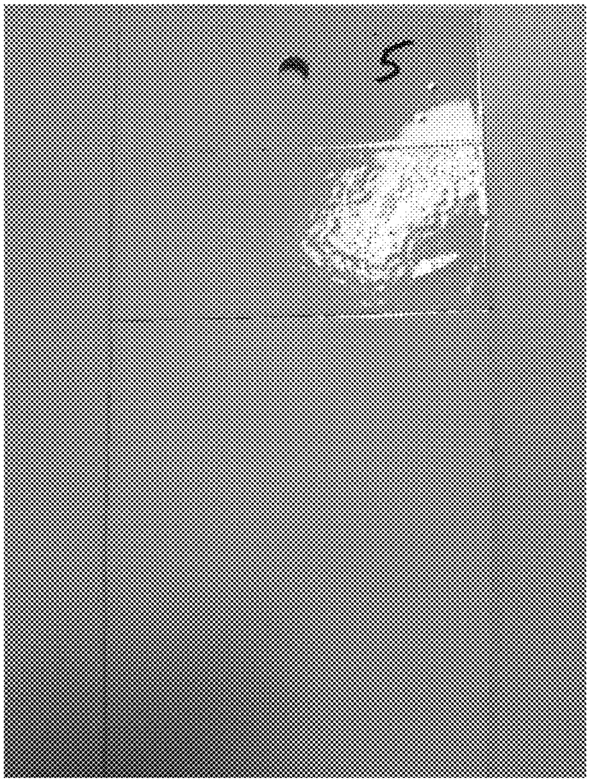

Panel 5 passed the test as shown in FIG. 4E.

Figure 4F:
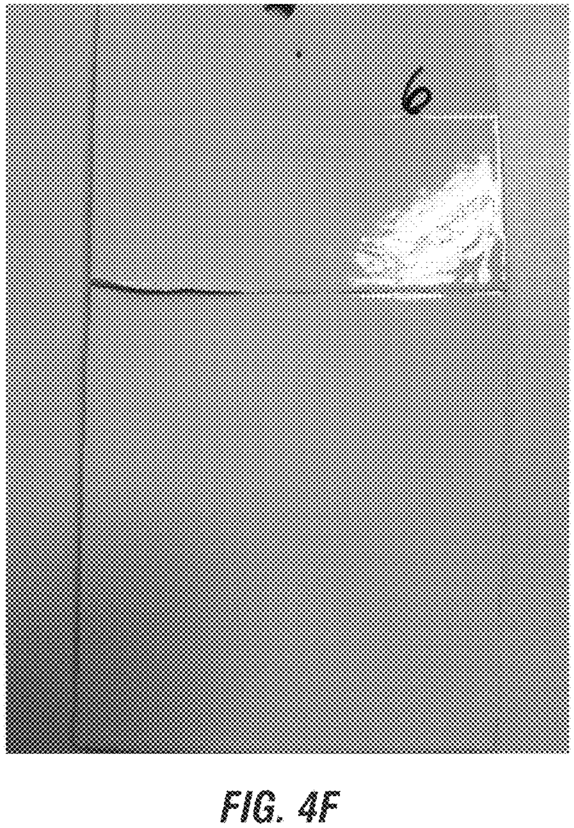

Panel 6 passed the test as shown in FIG. 4F.

Example 8

Additional testing of hard surface rinse aid compositions was compared to commercially-available formulations to assess performance efficacy. A 3% use concentration was employed for evalulating formulations for an exemplary hard surface rinse aid composition compared to commercial control formulations.

Commercial Formula 1 is shown above in Table 5A.

Hard Surface Rinse Aid Composition is shown above in Table 3.

Commercial Product II is a commercially-available acidic rinse composition as shown in Table 18.

Commercial Product III is a commercially-available acidic cleaner composition as shown in Table 19.

TABLE 18

| Description | Quantity (wt-%) |
|---|---|
| Citric acid | 1-5 |
| Polyoxyethylene benzyl alcohol ether | 1-5 |
| Potassium dihydrogen 2-hydroxypropane-1,2,3-tricarboxylate | 1-5 |
| Benzoic acid | 0.1-1 |

TABLE 19

| Description | Quantity (wt-%) |
|---|---|
| Sodium xylenesulphonate | 5-10 |
| Alcohols, C8-C10, ethers with polyethylene-polypropylene glycol monobenzyl ether | 1-5 |
| Gluconic acid | 1-5 |

The pH of each formulation and its respective 3% use solution was measured as shown in Table 20.

TABLE 20

| Formulation | Formula pH | 3% use solution pH |
|---|---|---|
| Commercial Formula 1 | 2.97 | 3.59 |
| Hard Surface Rinse Aid Composition | 2.22 | 6.27 |
| Commercial Product II | 3.04 | 3.47 |
| Commercial Product III | 5.33 | 6.01 |

Dynamic Contact Angle Measurement. The test quantitatively measured the angle at which a drop of solution contacts a test substrate. The evaluated formulations are each placed into the apparatus. A rectangle of a plastic substrate (material from a car bumper to be painted) was used as the substrate for testing. All experiments were carried out on a KRUSS DSA 100 drop shape analyzer. For each experiment, the rectangular substrate was placed onto the KRUSS DSA 100 stage with the temperature controlled by a Peltier plate to room temperature.

The substrate was allowed to rest on the stage for 10 minutes to allow it to reach room temperature. A 5 ul droplet of the composition at approximately 30,000 ppm concentration (3% use solution) was deposited onto the substrate, and the contact angle between the droplet and the surface was measured over a period of 12 seconds. All testing was completed at room temperature. Three measurements were carried out and averaged for each substrate/rinse composition combination. The deliverance of the drop to the substrate was also recorded by a camera. The video captured by the camera is sent to a computer where the contact angle can be determined. The lower the contact angle the better the solution will induce sheeting, meaning that the surface will dry more quickly and with fewer spots and be in better condition for application of paint to the surface.

Figure 5:
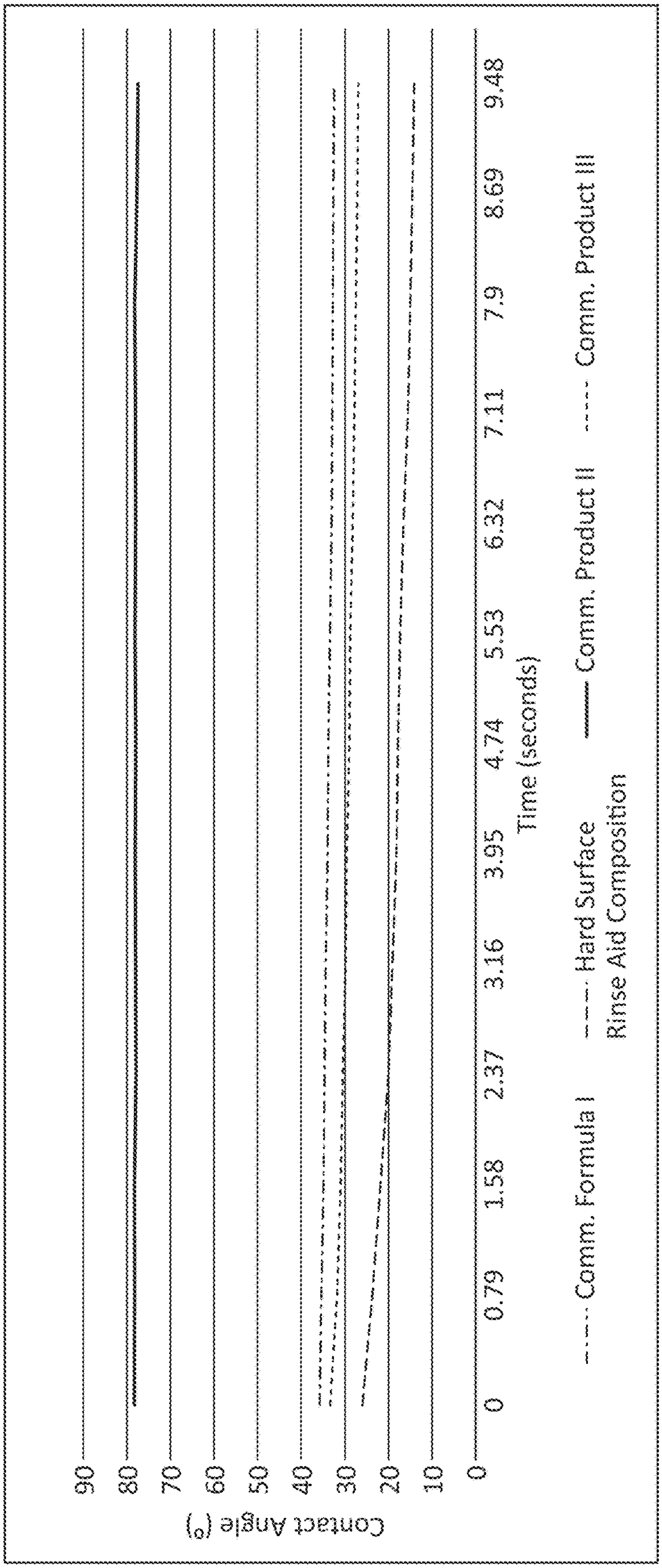
FIG. 5 shows contact angle measurements (assessing wettability of compositions) at a 3% use concentration for an exemplary hard surface rinse aid composition compared to commercial control formulations.
Figure 6A:
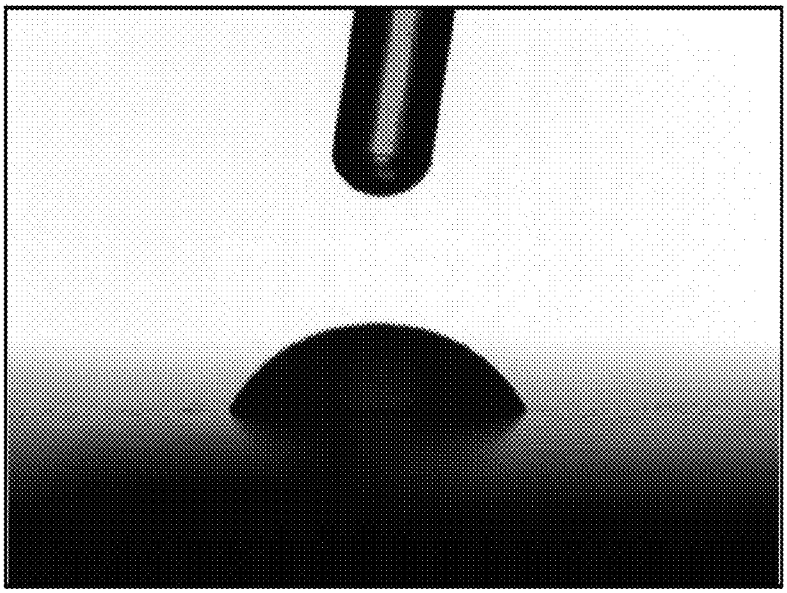
FIGS. 6A-6D show images of contact angles of evalulated rinse products in Example 5, including Commercial Formula 1 (6A), Hard Surface Rinse Aid Composition (6B), Commercial Product II (6C), and Commercial Product III (6D).
Figure 6B:
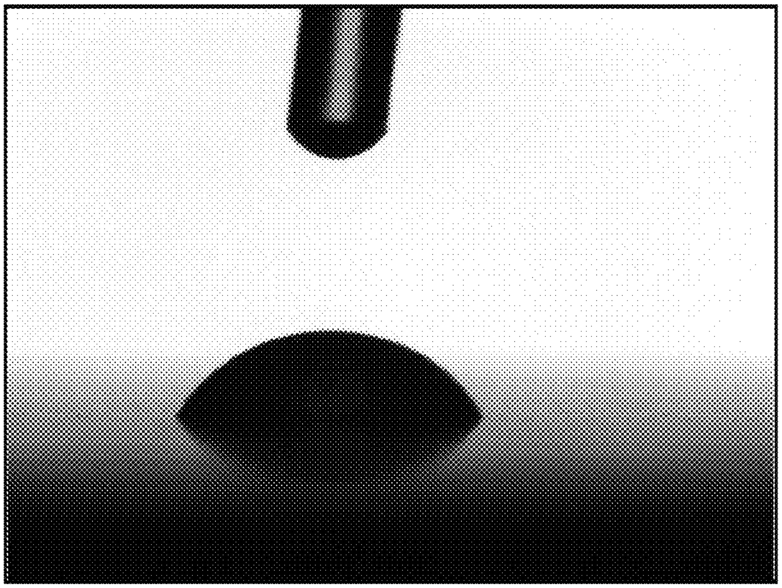
Figure 6C:
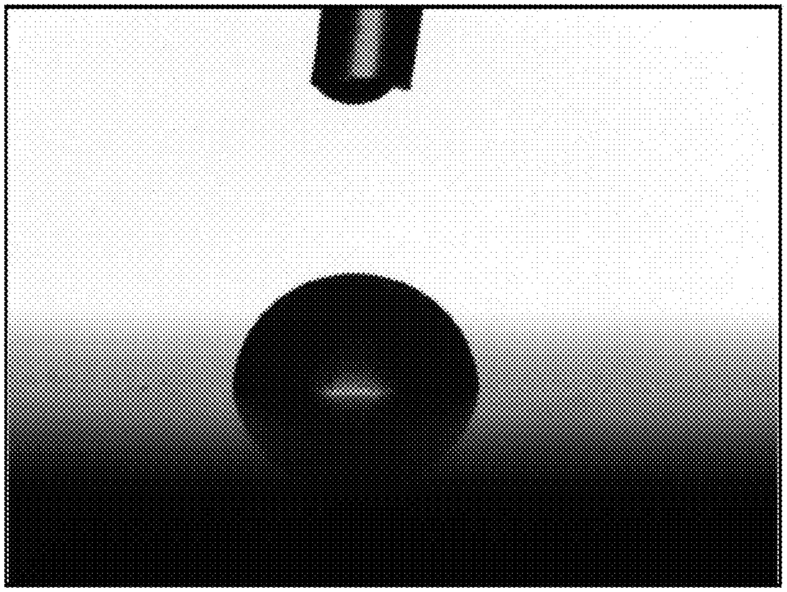
Figure 6D:
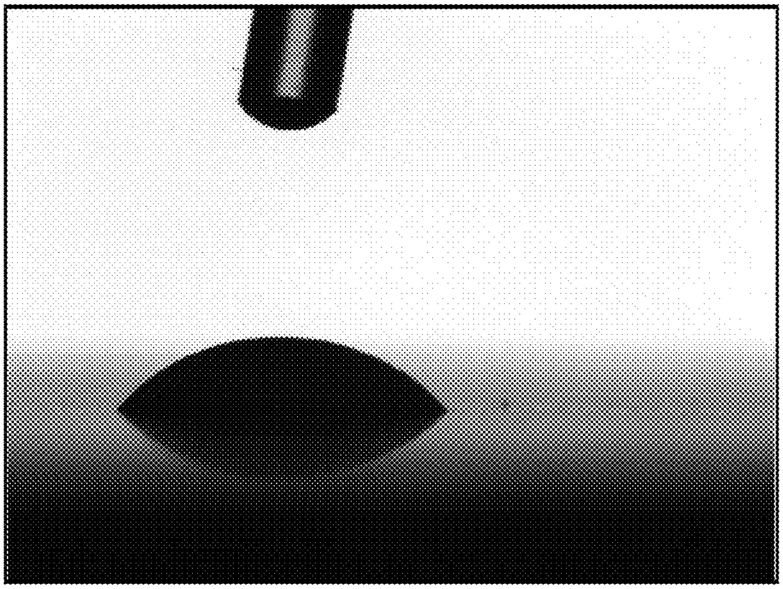

As shown in FIG. 5 the contact angle measurements (assessing wettability of the evaluated compositions) shows the hard surface rinse aid composition disclosed herein provides the greatest reduction in contact angle (lowest measured contact angle).

These results of the reduction in contact angle in comparison of the evalulated provides are visually shown in FIGS. 6A-6D for Commercial Formula 1 (6A), Hard Surface Rinse Aid Composition (6B), Commercial Product II (6C), and Commercial Product III (6D). The size of the droplet (more round shape) corresponds with a greater contact angle on the surface, providing less desirable rinsing of the surface. Accordingly the measured contact angle and visual depiction of the contact angle on a surface shown in FIGS. 5-6 confirm that the Hard Surface Rinse Aid Composition provides a desirable rinse formulation as described herein.

Example 9

Corrosion testing was performed on the Hard Surface Rinse Aid Composition to confirm safety for treatment of automotive parts (including plastics containing metal parts, wherein the metals may include aluminum requiring aluminum compatibility). Electrochemical methods followed by image collection were utilized to assess material compatibility between the equipment material and the evaluated rinse compositions.

Electrochemical analysis of 6063 aluminum alloy was conducted using cyclic polarization to probe the material compatibility with various solutions the metal is in contact with during cleaning. The pitting potential indicates the onset of pit formation, and it is evidenced in the cyclic polarization scans by a sharp increase in the current density with respect of the potential. A measured $E_{pit}$ of greater than 200 mV and current densities lower than 5 uA/cm$^2$ at 150 mV vs the open circuit potential (OCP) is the acceptance criteria that has been previously established for a substrate to be compatible with the test solution.

The results are shown in Table 21 showing electrochemical features from polarization curves of AA6063 soaked in different products.

TABLE 21

| Solution | Temperature (° C.) | $E_{pit}$ (mV) vs OCP | $i_{150\ mV\ vs\ OCP}$ (μA/cm$^2$) | Observed Hysteresis |
|---|---|---|---|---|
| Commercial Formula 1 | 60 | >1200 | 38 | None |
| Hard Surface Rinse Aid Composition | 60 | 482 | 3 | Positive |
| Commercial Product III | 60 | 472 | 32 | Positive |
| Commercial Product II | 60 | 397 | 45 | Positive |

Figure 7:
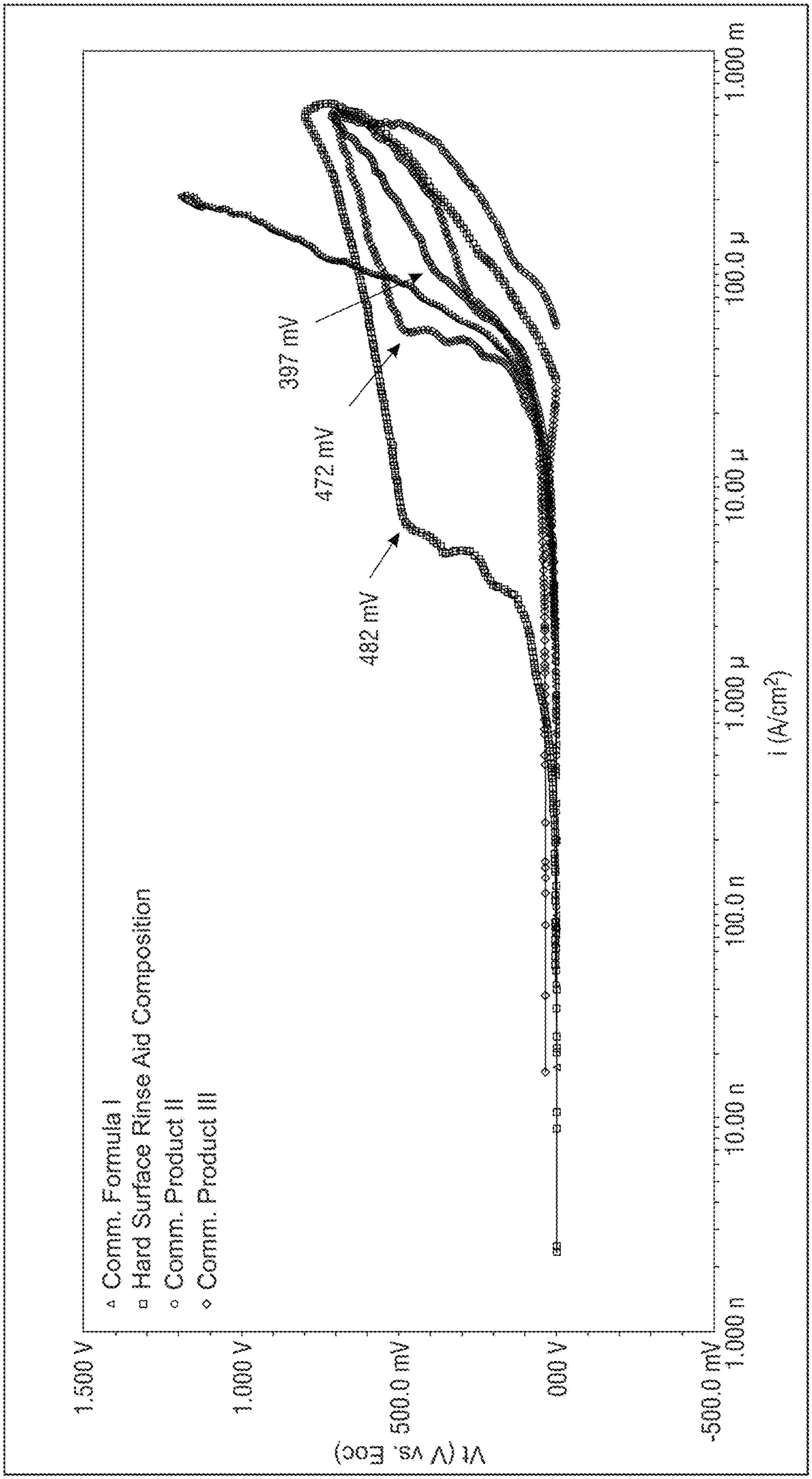
FIG. 7 shows cyclic polarization curves for the various forumlations tested in Example 6.

The cyclic polarization curves obtained for the various products at 60° C. are shown in FIG. 7. The Commercial Formula 1 shows the largest passivation region during the scans (>1200 mV) and may or may not exhibit a pitting potential ($E_{pit}$). The next largest was the Hard Surface Rinse Aid Composition (482 mV), followed by Commercial Product III (472 mV) and lastly, Commercial Product II (397 mV). All of the formulations pass the selection criterion of having an $E_{pit}$>200 mV, but only the Hard Surface Rinse Aid Composition also passes the second criterion of a measured current density at 150 mV being <5 μA/cm$^2$.

Example 10

Additional corrosion testing was performed on the Hard Surface Rinse Aid Composition to confirm safety for treatment of automotive parts (including plastics containing metal parts, wherein the metals may include aluminum requiring aluminum compatibility) with the same methods as described above.

The results are shown in Table 22 showing electrochemical features from polarization curves of AA6063 soaked in different products.

TABLE 22

| Solution | Temperature (° C.) | $E_{pit}$ (mV) vs OCP | $i_{150\ mV\ vs\ OCP}$ (μA/cm$^2$) | Calculated Corrosion Rate (mpy) | Observed Hysteresis |
|---|---|---|---|---|---|
| Commercial Formula 1 | 60 | 729 | 16 | 0.82 | None |
| Hard Surface Rinse Aid Composition | 60 | Not Observed | 4 | 0.57 | Positive |
| Commercial Product III | 60 | 422 | 29 | 1.17 | Positive |
| Commercial Product II | 60 | 503 | 37 | 1.82 | Positive |

These results further confirm the initial testing. The Hard Surface Rinse Aid Composition did not exhibit a pitting potential ($E_{pit}$), demonstrating further improvement over earlier testing. In addition the Hard Surface Rinse Aid Composition was the only solution to pass the <5 criteria and it has the lowest corrosion rate by almost 50%.

The inventions being thus described, it will be obvious that the same may be varied in many ways. Such variations are not to be regarded as a departure from the spirit and scope of the inventions and all such modifications are intended to be included within the scope of the following claims. The above specification provides a description of the manufacture and use of the disclosed compositions and methods. Since many embodiments can be made without departing from the spirit and scope of the invention, the invention resides in the claims.

What is claimed is:

1. A hard surface rinse aid composition comprising:

(A) from about 0.5 wt-% to about 3 wt-% of a nonionic alcohol alkoxylate surfactant according to the formula (I):

$$R^1\text{-O-(EO)}_{x1}\text{(PO)}_{y1}\text{-H} \quad (I)$$

wherein $R^1$ is a straight-chain $C_{10}$-$C_{16}$ alkyl, wherein $x_1$ is from 4 to 8, and wherein $y_1$ is from 2 to 5;

(B) from about 0.5 wt-% to about 3 wt-% of a nonionic alcohol alkoxylate surfactant according to the formula (II):

$$R^2\text{-O-(EO)}_{x2}\text{-H} \quad (II)$$

wherein $R^2$ is $C_{10}$-$C_{14}$ alkyl with an average of at least 2 branches per residue, and wherein $x_2$ is from 5 to 10;

(C) a reverse block co-polymer surfactant according to the formula (III):

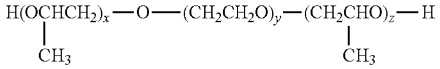

(III)

wherein x is from 15-25, y is from 10 to 25, and z is from 15 to 25;

(D) an acidic preservative composition comprising an anionic hydrotrope and an aluminum compatible preservative comprising diphosphonic acid or salt thereof; and (E) water, wherein the weight percent ratio of the anionic hydrotrope to water is from about 0.1:1 to about 0.5:1, wherein a use solution of the composition has a pH between about 4 to about 7 and is free of a detergent alkalinity source.

2. The composition of claim 1, wherein the use solution has a foam profile measured using the Glewwe method of foam height of less than 0.25 inches after 1 minute.

3. The composition of claim 1, wherein the composition comprises less than about 1 wt-% phosphates.

4. The composition of claim 1, wherein the ratio of Surfactant I to Surfactant II is about 1:1.

5. The composition of claim 1, wherein the ratio of Surfactant I to Surfactant III is about 1:5 to about 1:20.

6. The composition of claim 1, wherein the ratio of Surfactant II to Surfactant III is about 1:5 to about 1:20.

7. The composition of claim 1, wherein the ratio of the anionic hydrotrope to water is from about 0.3:1 to about 0.5:1.

8. The composition of claim 1, wherein the anionic hydrotrope comprises a short chain alkyl benzene and/or alkyl naphthalene hydrotrope.

9. The composition of claim 8, wherein the anionic hydrotrope is one or more of sodium xylene sulfonate, sodium toluene sulfonate, sodium cumene sulfonate, potassium toluene sulfonate, ammonium xylene sulfonate, calcium xylene sulfonate, sodium alkyl naphthalene sulfonate, and sodium butyl naphthalene sulfonate.

10. The composition of claim 1, wherein the aluminum compatible preservative comprises HEDP.

11. The composition of claim 1, wherein the acidic preservative composition comprises sodium xylene sulfonate, benzoic acid, sorbic acid, monosodium citrate, 1-hydroxyethane-1, 1-diphosphonic acid, methyl isothiazolinone and/or glutaraldehyde.

12. The composition of claim 1, wherein the composition comprises from about 0.5 wt-% to about 2 wt-% of the surfactant (I), from about 0.5 wt-% to about 2 wt-% of the surfactant (II), from about 5 wt-% to about 25 wt-% of the surfactant (III), from about 10 wt-% to about 40 wt-% of the anionic hydrotrope, from about 0.01 wt-% to about 5 wt-% of the aluminum compatible preservative, and the remainder of the composition comprises water.

13. A hard surface rinse aid composition comprising:

(A) from about 0.5 wt-% to about 3 wt-% of a nonionic alcohol alkoxylate surfactant according to the formula (I):

$R^1$-O-$(EO)_{x1}(PO)_{y1}$-H (I)

wherein $R^1$ is a straight-chain $C_{10}$-$C_{16}$ alkyl, wherein $x_1$ is from 4 to 8, and wherein $y_1$ is from 2 to 5;

(B) from about 0.5 wt-% to about 3 wt-% of a nonionic alcohol alkoxylate surfactant according to the formula (II):

$R^2$-O-$(EO)_{x2}$-H (II)

wherein $R^2$ is $C_{10}$-$C_{14}$ alkyl with an average of at least 2 branches per residue, and wherein $x_2$ is from 5 to 10;

(C) from about 5 wt-% to about 25 wt-% of a polymer surfactant according to the formula (III):

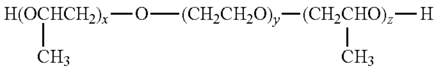

(III)

wherein x is from 15-25, y is from 10 to 25, and z is from 15 to 25;

(D) an acidic preservative composition comprising from about 10 wt-% to about 40 wt-% of an anionic hydrotrope and from about 0.01 wt-% to about 5 wt-% of an acid preservative and an optional additional aluminum compatible preservative comprising diphosphonic acid or salt thereof; and (E) water, wherein the weight percent ratio of the anionic hydrotrope to water is from about 0.1:1 to about 0.5:1, wherein a use solution of the composition has a pH between about 4 to about 7 and is free of a detergent alkalinity source.

14. A method of rinsing a hard surface outside of a ware wash and kitchen environment comprising:

contacting a hard surface rinse aid composition according to claim 1 to a surface in need of cleaning and rinsing;

wherein the surface comprises plastic and optionally metal.

15. The method of claim 14, wherein the hard surface comprises aluminum and is an automotive part.

16. The method of claim 15, wherein the contacting of the automotive part is performed by a spray wash and/or wherein the contacting of the automotive part precedes painting of the surface to provide a clean and rinsed hard surface.

17. The method of claim 14, wherein the hard surface rinse aid composition is provided at a concentration from about 1 wt-% to about 5 wt-%, and wherein the surfactants of components (A)-(C) are provided at a concentration from about 1,000 ppm to about 5,000 ppm.

18. The method of claim 14, wherein the contacting of the hard surface rinse aid composition is at a temperature below about 145° F.

19. The method of claim 14, wherein the pH of the hard surface rinse aid composition in a use solution of at least about 1% actives is between about 4 and about 7.

20. The method of claim 14, further comprising diluting the hard surface rinse aid composition with a source of water that is not a deionized or softened water source, and/or wherein the water source for dilution has hardness ions in the amount of at least about 5 grain per gallon (gpg).

* * * * *